(12) United States Patent
Sakhnini et al.

(10) Patent No.: US 12,476,854 B2
(45) Date of Patent: Nov. 18, 2025

(54) TECHNIQUES FOR SIGNALING SYMBOL FORMAT FOR GUARD INTERVAL BASED WAVEFORMS

(71) Applicant: QUALCOMM Incorporated, San Diego, CA (US)

(72) Inventors: Iyab Issam Sakhnini, San Diego, CA (US); Tao Luo, San Diego, CA (US); Jing Sun, San Diego, CA (US); Morteza Soltani, San Diego, CA (US); Xiaoxia Zhang, San Diego, CA (US); Jun Ma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 222 days.

(21) Appl. No.: 17/518,022

(22) Filed: Nov. 3, 2021

(65) Prior Publication Data

US 2023/0135780 A1    May 4, 2023

(51) Int. Cl.
*H04L 27/26* (2006.01)
*H04W 8/24* (2009.01)
*H04W 72/20* (2023.01)

(52) U.S. Cl.
CPC .... *H04L 27/2607* (2013.01); *H04L 27/26524* (2021.01); *H04W 8/24* (2013.01); *H04W 72/20* (2023.01)

(58) Field of Classification Search
None
See application file for complete search history.

(56) References Cited

U.S. PATENT DOCUMENTS

| | | | |
|---|---|---|---|
| 10,461,979 B2 | 10/2019 | Pawar et al. | |
| 2011/0164671 A1* | 7/2011 | Matsumura | H04L 27/2676 375/229 |
| 2011/0317682 A1* | 12/2011 | Matsumura | H04L 27/2607 370/343 |

(Continued)

FOREIGN PATENT DOCUMENTS

EP    3324632 A1    5/2018

OTHER PUBLICATIONS

International Search Report and Written Opinion—PCT/US2022/045893—ISA/EPO—Jan. 17, 2023.

*Primary Examiner* — Wutchung Chu
*Assistant Examiner* — Berhanu D Belete
(74) *Attorney, Agent, or Firm* — Dalei Dong; Holland & Hart LLP

(57) ABSTRACT

Methods, systems, and devices for wireless communications are described for indication of one or more symbol structures for one or multiple subsets of a set of symbols. The one or more symbol structures may include one or more guard interval (GI)-based symbol formats that are to be applied to one or more of the subsets of symbols. Different symbol formats may be indicated for different subsets of symbols, and a first subset of symbols may use a GI-based symbol format and a second subset of symbols may use a CP-based or GI-based symbol format. A base station may transmit control signaling to a user equipment to indicate one or more symbol structures for the one or more subsets of symbols, and the UE and the base station may communicate data in one or more slots in accordance with the indicated symbol structures based on the control signaling.

23 Claims, 24 Drawing Sheets

(56) References Cited

U.S. PATENT DOCUMENTS

| | | | | |
|---|---|---|---|---|
| 2014/0355626 | A1* | 12/2014 | Fechtel | H04L 69/22 |
| | | | | 370/474 |
| 2015/0123928 | A1* | 5/2015 | Zhu | G06F 3/04883 |
| | | | | 345/173 |
| 2016/0088604 | A1* | 3/2016 | Patel | H04W 72/0446 |
| | | | | 370/336 |
| 2016/0088652 | A1* | 3/2016 | Patel | H04L 5/0053 |
| | | | | 370/329 |
| 2016/0119452 | A1* | 4/2016 | Lee | H04L 69/10 |
| | | | | 370/338 |
| 2016/0212000 | A1* | 7/2016 | Zhang | H04L 5/0023 |
| 2018/0097671 | A1* | 4/2018 | Huang | H04L 27/261 |
| 2018/0331870 | A1* | 11/2018 | Sun | H04L 5/0007 |
| 2018/0367362 | A1* | 12/2018 | Sun | H04L 27/2636 |
| 2019/0097859 | A1 | 3/2019 | Bala et al. | |
| 2019/0132829 | A1* | 5/2019 | Bhattad | H04L 27/2607 |
| 2019/0246416 | A1* | 8/2019 | Park | H04W 72/21 |
| 2019/0363843 | A1* | 11/2019 | Gordaychik | H04L 1/1835 |
| 2020/0128585 | A1* | 4/2020 | Kuang | H04L 5/0094 |
| 2020/0260450 | A1* | 8/2020 | Ji | H04L 5/0091 |
| 2020/0413420 | A1* | 12/2020 | Nam | H04W 24/10 |
| 2021/0058207 | A1* | 2/2021 | Lee | H04L 5/0048 |
| 2021/0168589 | A1* | 6/2021 | Yasukawa | H04W 72/04 |
| 2021/0392625 | A1* | 12/2021 | Lin | H04W 72/23 |
| 2022/0053569 | A1* | 2/2022 | Kuang | H04W 8/22 |
| 2022/0200755 | A1* | 6/2022 | Lee | H04L 5/0048 |
| 2022/0256458 | A1* | 8/2022 | Noh | H04B 7/06 |
| 2022/0353698 | A1* | 11/2022 | Jang | H04L 1/189 |

\* cited by examiner

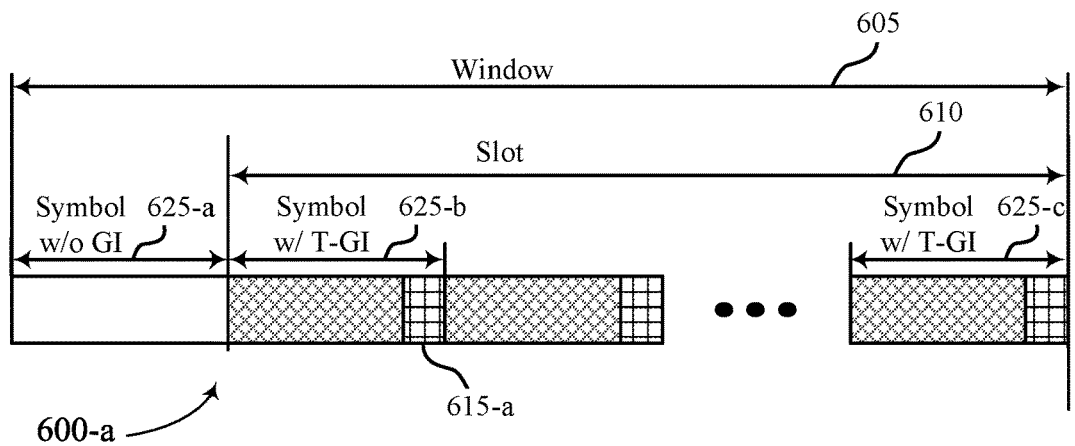
FIG. 6A
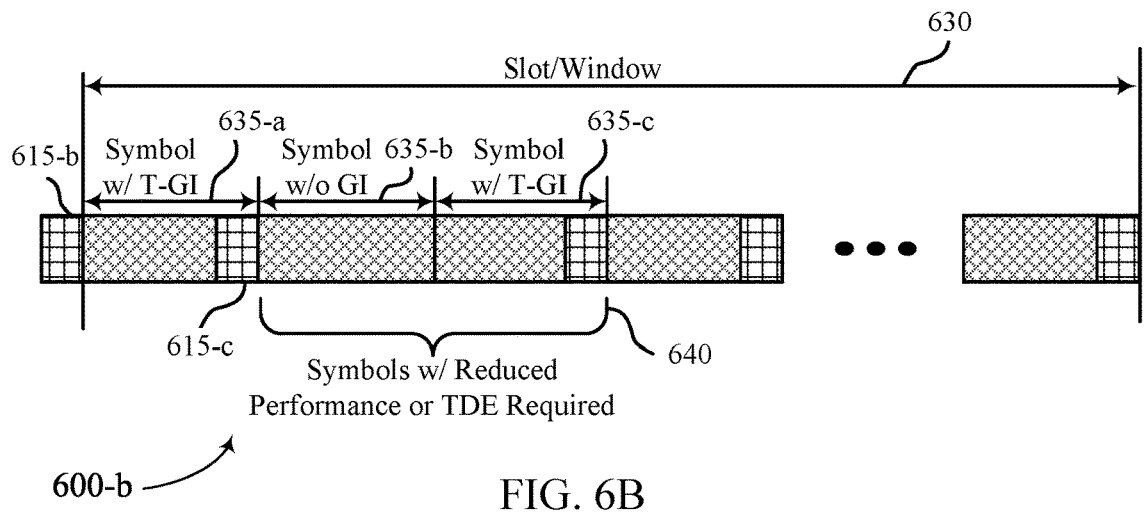
FIG. 6B
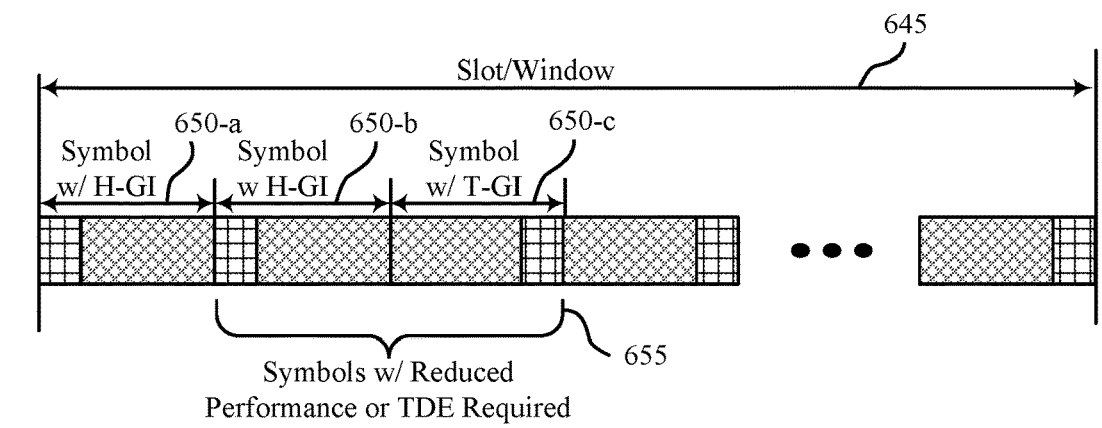
FIG. 6C
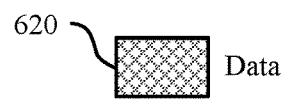

TECHNIQUES FOR SIGNALING SYMBOL FORMAT FOR GUARD INTERVAL BASED WAVEFORMS

FIELD OF TECHNOLOGY

The following relates to wireless communications, including techniques for signaling symbol format for guard interval based waveforms.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE and a base station may communicate in a set of transmission time intervals (TTIs). In some cases, the UE and the base station may communicate in relatively high frequency bands according to one or more different waveform types. For example, a first waveform type may support cyclic prefix-based waveforms and a second waveform type may support guard interval-based waveforms. However, if a system supports both such waveform types in a frequency band, wireless devices using different waveform types may potentially experience inter-symbol interference, symbol or slot misalignment, or some combination thereof.

SUMMARY

The described techniques relate to improved methods, systems, devices, and apparatuses that support techniques for signaling symbol format for guard interval based waveforms. In accordance with various aspects, described techniques provide for a base station to indicate a configuration for a symbol format for one or more subsets of symbols in a resource allocation. The base station and a user equipment (UE) may communicate data during one or more slots in accordance with one or more indicated symbol formats for one or more subsets of symbols. In some cases, the indicated symbol format may be a guard interval-based symbol format. In some cases, different symbol formats may be indicated for different subsets of symbols, and a first subset of symbols may use a guard interval-based symbol format and a second subset of symbols may use a cyclic prefix-based or guard interval-based symbol format. The base station may transmit control signaling (e.g., downlink control information (DCI)) to the UE to indicate one or more symbol formats for one or more subsets of symbols. The UE and the base station may communicate data in one or more slots in accordance with the indicated symbol formats based on the control signaling. A slot as described herein may be any frame, subframe, symbol, set of symbols, or other transmission time interval (TTI). The symbol format may correspond to a configuration of a slot, which may include a configuration of cyclic prefixes, guard intervals, symbols, discrete Fourier transform (DFT) windows, or any combination of these or other communication parameters for different subsets of symbols. As such, by using control signaling indicating a configuration for one or more symbol formats, the base station and the UE may switch between slot formats during communications, which may reduce latency, reduce UE complexity, and improve communication reliability.

A method for wireless communication at a user equipment (UE) is described. The method may include receiving, from a base station, control information indicating a symbol structure for a set of symbols, the symbol structure including a symbol format of a set of multiple symbol formats for one or more subsets of the set of symbols, identifying, based on the symbol format of the set of multiple symbol formats, a first guard interval format of a first subset of the set of symbols, and communicating with the base station during the first subset of symbols in accordance with the first guard interval format.

An apparatus for wireless communication at a UE is described. The apparatus may include a processor, memory coupled with the processor, and instructions stored in the memory. The instructions may be executable by the processor to cause the apparatus to receive, from a base station, control information indicating a symbol structure for a set of symbols, the symbol structure including a symbol format of a set of multiple symbol formats for one or more subsets of the set of symbols, identify, based on the symbol format of the set of multiple symbol formats, a first guard interval format of a first subset of the set of symbols, and communicate with the base station during the first subset of symbols in accordance with the first guard interval format.

Another apparatus for wireless communication at a UE is described. The apparatus may include means for receiving, from a base station, control information indicating a symbol structure for a set of symbols, the symbol structure including a symbol format of a set of multiple symbol formats for one or more subsets of the set of symbols, means for identifying, based on the symbol format of the set of multiple symbol formats, a first guard interval format of a first subset of the set of symbols, and means for communicating with the base station during the first subset of symbols in accordance with the first guard interval format.

A non-transitory computer-readable medium storing code for wireless communication at a UE is described. The code may include instructions executable by a processor to receive, from a base station, control information indicating a symbol structure for a set of symbols, the symbol structure including a symbol format of a set of multiple symbol formats for one or more subsets of the set of symbols, identify, based on the symbol format of the set of multiple symbol formats, a first guard interval format of a first subset of the set of symbols, and communicate with the base station during the first subset of symbols in accordance with the first guard interval format.

Some examples of the method, apparatuses, and non-transitory computer-readable medium described herein may further include operations, features, means, or instructions for determining, based on the symbol format of the set of multiple symbol formats, that at least a second subset of symbols has a second symbol format of the set of multiple different available symbol formats that is different than the first guard interval format and communicating with the base station during at least the second subset of symbols in accordance with the second symbol format.

In some examples of the method, apparatuses, and non-transitory computer-readable medium described herein, the control information indicates one or more of a guard interval length, guard interval type, a receiver discrete Fourier transform (DFT) window placement relative to a symbol boundary, a receiver DFT window size, an indication of one or more gaps within one or more symbols, or any combinations thereof, for at least the first subset of symbols. In some examples of the method, apparatuses, and non-transitory computer-readable medium described herein, the guard interval type indicates a header guard interval in which a guard interval precedes data within a symbol, a tail guard interval in which data precedes a guard interval within the symbol, or that no guard interval is present in the symbol. In some examples of the method, apparatuses, and non-transitory computer-readable medium described herein, the guard interval type further indicates a zero tail or unique word guard interval, a guard interval generation technique, or any combinations thereof. In some examples of the method, apparatuses, and non-transitory computer-readable medium described herein, the receiver DFT window placement indicates a normal, a delayed, or an advanced receiver DFT window relative to a time domain symbol boundary. In some examples of the method, apparatuses, and non-transitory computer-readable medium described herein, the receiver DFT window size indicates a DFT duration as a DFT window size value or as an indication of a selected DFT window size from a set of available DFT window sizes. In some examples of the method, apparatuses, and non-transitory computer-readable medium described herein, the indication of one or more gaps within one or more symbols indicates a presence or absence of a gap associated with a guard interval within a symbol, a location of the guard interval within the symbol, or any combinations thereof.

In some examples of the method, apparatuses, and non-transitory computer-readable medium described herein, the receiving may include operations, features, means, or instructions for receiving the control information in one or more of radio resource control (RRC) signaling, a medium access control (MAC) control element (CE), downlink control information, or any combinations thereof. In some examples of the method, apparatuses, and non-transitory computer-readable medium described herein, the control information includes a symbol format indicator for each of the one or more subsets of the set of symbols, and where the symbol format indicator may be transmitted in DCI or a MAC-CE associated with the set of symbols, or the symbol format indicator may be configured via RRC signaling and a subsequent indicator provided in DCI or a MAC-CE can indicate a temporary change in the symbol structure. In some examples of the method, apparatuses, and non-transitory computer-readable medium described herein, the control information may be provided for one or more UEs, one or more beams, one or more sub-bands, one or more UE antenna panels, one or more channels, or any combinations thereof.

In some examples of the method, apparatuses, and non-transitory computer-readable medium described herein, the control information indicates the symbol format for each symbol of the set of symbols, or indicates a mapping between symbol formats of the one or more subsets of the set of symbols and one or more transmission parameters. In some examples of the method, apparatuses, and non-transitory computer-readable medium described herein, the symbol structure is applied across all symbols after the receiving the control information, is applied according to a pattern of sets of symbols, is applied for a configured time period, is applied for one or more slots or sub-slots, or any combinations thereof.

Some examples of the method, apparatuses, and non-transitory computer-readable medium described herein may further include operations, features, means, or instructions for transmitting a UE capability report to the base station, where the control information indicating the symbol structure may be received based on the UE capability report. Some examples of the method, apparatuses, and non-transitory computer-readable medium described herein may further include operations, features, means, or instructions for applying the symbol structure for the set of symbols that start at a time period after receiving the control information, where the time period is indicated by the control information, is based on a UE capability, or any combinations thereof.

A method for wireless communication at a base station is described. The method may include transmitting, to a UE, control information that indicates a symbol structure for a set of symbols, the symbol structure indicating a symbol format of a set of multiple symbol formats for one or more subsets of the set of symbols, identifying, based on the symbol format of the set of multiple symbol formats, a first guard interval format of a first subset of the set of symbols, and communicating with the UE during at least the first subset of symbols in accordance with the first guard interval format.

An apparatus for wireless communication at a base station is described. The apparatus may include a processor, memory coupled with the processor, and instructions stored in the memory. The instructions may be executable by the processor to cause the apparatus to transmit, to a UE, control information that indicates a symbol structure for a set of symbols, the symbol structure indicating a symbol format of a set of multiple symbol formats for one or more subsets of the set of symbols, identify, based on the symbol format of the set of multiple symbol formats, a first guard interval format of a first subset of the set of symbols, and communicate with the UE during at least the first subset of symbols in accordance with the first guard interval format.

Another apparatus for wireless communication at a base station is described. The apparatus may include means for transmitting, to a UE, control information that indicates a symbol structure for a set of symbols, the symbol structure indicating a symbol format of a set of multiple symbol formats for one or more subsets of the set of symbols, means for identifying, based on the symbol format of the set of multiple symbol formats, a first guard interval format of a first subset of the set of symbols, and means for communicating with the UE during at least the first subset of symbols in accordance with the first guard interval format.

A non-transitory computer-readable medium storing code for wireless communication at a base station is described. The code may include instructions executable by a processor to transmit, to a UE, control information that indicates a symbol structure for a set of symbols, the symbol structure indicating a symbol format of a set of multiple symbol formats for one or more subsets of the set of symbols, identify, based on the symbol format of the set of multiple symbol formats, a first guard interval format of a first subset of the set of symbols, and communicate with the UE during at least the first subset of symbols in accordance with the first guard interval format.

In some examples of the method, apparatuses, and non-transitory computer-readable medium described herein, the control information indicates one or more of a guard interval length, guard interval type, a receiver DFT window placement relative to a symbol boundary, a receiver DFT window size, an indication of one or more gaps within one or more symbols, or any combinations thereof, for at least the first subset of symbols. In some examples of the method, apparatuses, and non-transitory computer-readable medium described herein, the guard interval type indicates a header guard interval in which a guard interval precedes data within a symbol, a tail guard interval in which data precedes the guard interval within the symbol, or that no guard interval is present in the symbol.

In some examples of the method, apparatuses, and non-transitory computer-readable medium described herein, the receiver DFT window placement indicates a normal, a delayed, or an advanced receiver DFT window relative to a time domain symbol boundary, and the receiver DFT window size indicates a DFT duration as a DFT window size value or as an indication of a selected DFT window size from a set of available DFT window sizes. In some examples of the method, apparatuses, and non-transitory computer-readable medium described herein, the transmitting may include operations, features, means, or instructions for transmitting the control information in one or more of RRC signaling, a MAC-CE, DCI, or any combinations thereof.

Some examples of the method, apparatuses, and non-transitory computer-readable medium described herein may further include operations, features, means, or instructions for determining, based on the symbol format of the set of multiple symbol formats, that at least a second subset of symbols of the set of symbols has a second symbol format that is different than the first guard interval format and communicating with the UE during at least the second subset of symbols in accordance with the second symbol format.

In some examples of the method, apparatuses, and non-transitory computer-readable medium described herein, the control information includes a symbol format indicator for each of the one or more subsets of the set of symbols, and where the symbol format indicator may be transmitted in DCI or a MAC-CE associated with the set of symbols, or the symbol format indicator may be configured via RRC signaling and a subsequent indicator provided in DCI or a MAC-CE can indicate a temporary change in the symbol structure. Some examples of the method, apparatuses, and non-transitory computer-readable medium described herein may further include operations, features, means, or instructions for receiving a UE capability report from the UE, where the control information indicating the symbol structure is transmitted based on the UE capability report.

BRIEF DESCRIPTION OF THE DRAWINGS

FIGS. 6A through 6C illustrate examples of symbol structures that support techniques for signaling symbol format for guard interval based waveforms in accordance with aspects of the present disclosure.

DETAILED DESCRIPTION

Figure 1:
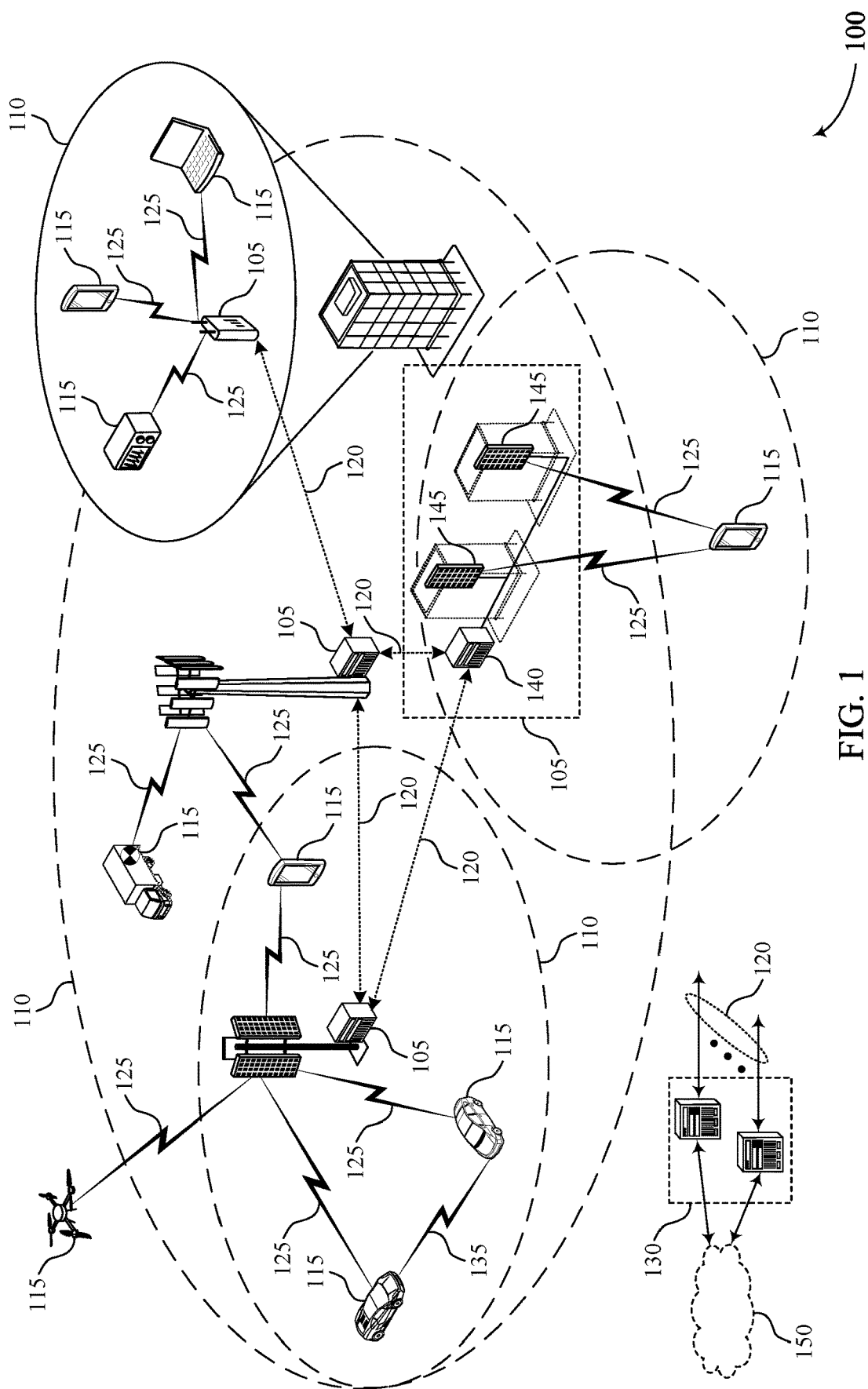
FIG. 1 illustrates an example of a wireless communications system that supports techniques for signaling symbol format for guard interval based waveforms in accordance with aspects of the present disclosure.

In some wireless communications systems, a user equipment (UE) and a base station may communicate within a set of symbols in accordance with one or more symbol formats. As used herein, a set of symbols may correspond to one or more slots, one or more subframes, one or more frames, or any other transmission time interval (TTI). In some examples, UEs and base stations in a wireless communications system may communicate according to multiple different waveforms to increase bandwidth in higher frequency bands, and each waveform may support a different symbol format. For example, each waveform may correspond to a different configuration of cyclic prefixes (CPs), guard intervals (GIs), or both. Additionally or alternatively, different symbol formats may correspond to different symbol durations, discrete Fourier transform (DFT) window sizes, other communication parameters, or any combination thereof. However, if a system supports multiple such symbol formats for different waveform types in a frequency band, wireless devices using different waveform types in the frequency band may potentially experience inter-symbol interference, symbol or slot misalignment, or some combination thereof, reducing communication reliability for the system.

To support efficient communications, a base station as described herein may transmit control signaling to a UE to indicate a configuration for a symbol format for one or more subsets of symbols in a resource allocation. The base station and a UE may communicate data during one or more slots in accordance with one or more indicated symbol formats for the one or more subsets of symbols. In some cases, the indicated symbol format may be a GI-based symbol format. In some cases, different symbol formats may be indicated for different subsets of symbols, and a first subset of symbols may use a GI-based symbol format and a second subset of symbols may use a CP-based or GI-based symbol format. The base station may transmit control signaling (e.g., downlink control information (DCI)) to the UE to indicate one or more symbol formats for one or more subsets of symbols. The UE and the base station may communicate data in one or more slots in accordance with the indicated symbol formats based on the control signaling.

A slot as described herein may be any frame, subframe, symbol, set of symbols, or other TTI. The symbol format may correspond to a configuration of a slot, which may include a configuration of cyclic prefixes, guard intervals, symbols, DFT windows, or any combination of these or other communication parameters for different subsets of symbols. As such, by using control signaling indicating a configuration for one or more symbol formats, the base station and the UE may switch between slot formats during communications, which may reduce latency, reduce UE complexity, and improve communication reliability. For example, the configured slot formats may support symbol-level alignment across different slot formats, slot-level alignment across different slot formats, inter-symbol and inter-slot interference mitigation between different slot formats, or any combinations thereof. In some cases, the base station may transmit a control signal that includes fields configured to indicate a symbol format for one or more subsets of symbols. In some examples, the control signal may be based on a UE capability report, UE assistance information indicating a symbol format preferred by the UE, or both. The configured symbol format may apply to all communications by the UE or may apply to a subset of communications indicated via the control signaling. For example, the subset of communications may include a subset of indicated multiple-input multiple-output (MIMO) layers, transmission configuration indicator (TCI) states (e.g., beams), sub-bands, UE antenna panels, or any combination thereof.

Aspects of the disclosure are initially described in the context of wireless communications systems. Additional aspects are described with reference to slot formats, communication timelines, DFT window configurations, and process flows. Aspects of the disclosure are further illustrated by and described with reference to apparatus diagrams, system diagrams, and flowcharts that relate to techniques for signaling symbol format for guard interval based waveforms.

FIG. 1 illustrates an example of a wireless communications system 100 that supports techniques for signaling symbol format for guard interval based waveforms in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, one or more base stations 105 and one or more UEs 115 may use multiple different types of waveforms for wireless communications. For example, such devices may use a GI-based waveform and a CP-based waveform for various communications. In accordance with various aspects as discussed herein, a base station 105 may indicate a configuration for a symbol format for one or more subsets of symbols in a resource allocation to a UE 115 (or multiple UEs 115). The base station 105 and UE 115 may communicate data in accordance with one or more indicated symbol formats for the one or more subsets of symbols. In some cases, the indicated symbol format may be a GI-based symbol format. In some cases, different symbol formats may be indicated for different subsets of symbols, and a first subset of symbols may use a GI-based symbol format and a second subset of symbols may use a CP-based or GI-based symbol format. The base station 105 may transmit control signaling (e.g., DCI) to the UE 115 to indicate one or more symbol formats for the one or more subsets of symbols, and the UE 115 and the base station 105 may communicate data in one or more slots in accordance with the indicated symbol formats based on the control signaling.

Figure 2:
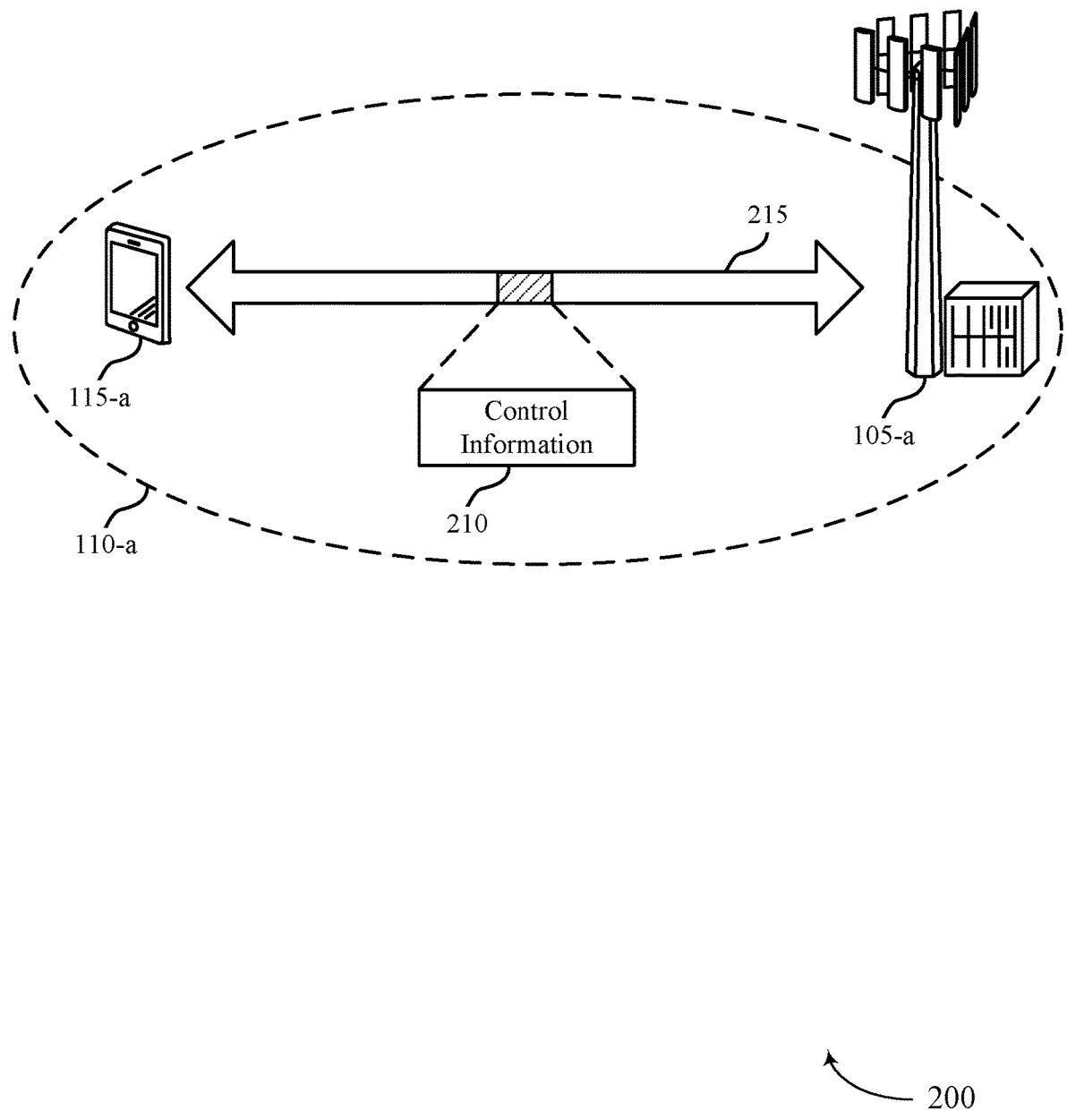
FIG. 2 illustrates an example of a portion of a wireless communications system that supports techniques for signaling symbol format for guard interval based waveforms in accordance with aspects of the present disclosure.

FIG. 2 illustrates an example of a wireless communications system 200 that supports techniques for signaling symbol format for guard interval based waveforms in accordance with aspects of the present disclosure. The wireless communications system 200 may include a base station 105-a and a UE 115-a, which may represent examples of a base station 105 and a UE 115 as described with reference to FIG. 1. The base station 105-a and the UE 115-a may communicate within a geographic coverage area 110-a and via a communication link 215. In some examples, the base station 105-a may transmit a control information 210 to the UE 115-a to indicate a configuration for a symbol structure for a set of symbols (e.g., for one or more slots).

The UE 115-a and the base station 105-a may communicate via the communication link 215 in accordance with one or more different types of waveforms. In some examples, the UE 115-a and the base station 105-a may communicate over a relatively high operating frequency band, such as frequency range two (FR2), using one or more waveforms that support uplink communications, downlink communications, or both. The waveforms may include a guard interval-based OFDM waveform, cyclic prefix-OFDM waveform, a single carrier frequency domain waveform (e.g., DFT-s-OFDM), a single carrier time domain waveform (e.g., single carrier quadrature amplitude modulation (SC-QAM)), or any combinations thereof. A symbol structure as described herein may correspond to a configuration of CPs, GIs, symbols, DFT windows, other communication parameters, or any combinations thereof within a slot of any length or partitioning (e.g., spanning any number of symbols, subframes, frames, or any other TTI).

The CP-OFDM waveform may provide for a UE 115-a to perform a single tap frequency domain equalizer (FDE) operation. The CP-OFDM may additionally or alternatively provide support for efficient bandwidth utilization (e.g., based on using a reduced guard band bandwidth), FDM between wireless devices, and relatively high order MIMO (e.g., above a MIMO order threshold). Communications in relatively higher frequency bands may result in relatively high phase noise and relatively wide operating bandwidths as compared to lower frequency bands. To account for the relatively high phase noise and relatively wide bandwidth, the CP-OFDM waveform may support a relatively large subcarrier spacing (SCS) as compared with other waveforms.

The single carrier frequency domain waveform may support a CP-based slot format or a GI-based slot format. The single carrier frequency domain waveform may provide for a UE 115-a to perform a single tap FDE operation and may provide for efficient bandwidth utilization (e.g., including a reduced guard band bandwidth), lower peak-to-average power ratio (PAPR) (e.g., compared to some other waveforms), FDM between wireless devices, or any combination thereof. The single carrier frequency domain waveform may operate according to a relatively large SCS as compared to other waveforms, which may support communications in higher frequency bands, similar to the CP-OFDM waveform as described herein. In some cases, the single carrier time domain waveform may be a relatively low complexity waveform (e.g., involving relatively low UE processing overhead) as compared with other waveforms. For example, the single carrier time domain waveform may include motivation symbols for decoding the waveform, and the UE 115-a may refrain from performing fast Fourier transform (FFT) or inverse FFT (IFFT) operations for decoding the waveform. The single carrier time domain waveform may support a single tap FDE or time domain equalizer (TDE) operation by the UE 115-a. The single carrier time domain waveform may support a relatively lower signal to noise ratio (SNR) and PAPR than other waveforms. For example, time domain filtering may be performed for the single carrier time domain waveform to achieve a relatively low PAPR. In some cases, the single carrier time domain waveform may support FDM between wireless devise using extra guard bands.

In some cases, the UE 115-a and the base station 105-a may dynamically or semi-statically switch between waveforms for communications based on time or frequency regions, SNR metrics, or other communication parameters. For example, if the UE 115-a detects a relatively low SNR, the UE 115-a may switch from communicating according to a first waveform to communicating according to the single carrier time domain waveform. If the UE 115-a switches between waveforms, a corresponding slot format may change dynamically or semi-statically. In some examples, the UE 115-a may switch between a cyclic prefix-based slot format and a guard interval-based slot format. In some cases, in addition to or as an alternative to switching between waveforms, the UE 115-a and the base station 105-a may switch between slot formats to support reduced latency, reduced UE complexity, efficient beam switching, transmission of extra reference signals, or any combination thereof. In some cases, the base station 105-a may transmit control signaling to indicate a configuration of uplink and downlink symbols in each slot.

In some cases, to provide for efficient slot format switching and improved coordination between devices, the base station 105-a as described herein may transmit control signaling (e.g., RRC, MAC control element (MAC-CE), DCI, or other control signaling) that includes the control information 210 to the UE 115-a to indicate a symbol structure for a set of symbols. A set of symbols as described herein may include OFDM symbols of one or more slots, sub-slots, subframes, frames, or any other TTI. A configuration for a symbol structure may indicate a configuration of GIs, CPs, symbol sizes of one or more symbols, DFT sizes associated with one or more DFT windows, other parameters associated with communications in the set of symbols, or any combination thereof. For example, the control information 210 may indicate a CP-based symbol structure, a non-slot contained GI-based symbol structure, a slot contained GI-based symbol structure, a symbol structure corresponding to different DFT window sizes, other slot formats, or any combination thereof. Examples of different symbol structure configurations for one or more sets of symbols and corresponding communication parameters are described in further detail herein, including with reference to FIGS. 3 through 5.

In the example of FIG. 2, the control information 210 may indicate a symbol structure including a symbol format of multiple different available symbol formats for one or more subsets of a set of symbols. Based on the control information 210, the UE 115-a may identify a first GI format of a first subset of the set of symbols, and may communicate with the base station 105-a during the first subset of symbols in accordance with the first GI format. In some cases, the UE 115-a may determine that a second subset of symbols has a second symbol format of the different available symbol formats that is different than the first GI format (e.g., the second symbol format may be a different GI format, may be a CP-based format, etc.), and the UE 115-a may communicate with the base station 105-a during the second subset of symbols in accordance with the second symbol format.

In some cases, the base station 105-a may transmit, with the control information 210 or in a separate communication, configuration information (e.g., an RRC configuration message) that configures the multiple different available symbol structures for the UE 115-a as a set of configured symbol structures. For example, the base station 105-a may RRC configure the UE 115-a with a set of code-points, and each code-point may represent one or more symbol structures of the set of configured symbol structures. The base station 105-a may subsequently transmit control information 210 (e.g., a DCI message) that indicates the selected symbol structure from the set of configured symbol structures. The control information 210 may include a field configured to convey an identifier (e.g., corresponding to a code-point) associated with the selected symbol structure or symbol structures. Each symbol structure of the set of configured symbol structures may indicate a type of the symbol structure (e.g., CP-based, GI-based, or another type), a quantity of symbols, a location and contents of one or more symbols in the set of symbols, a location and size of one or more DFT windows in the set of symbols, or any combinations thereof. In some cases, a symbol format indicator (SyFI) field may be included in control information 210 (e.g., that is dynamically provided using DCI or MAC-CE, semi-statically provided using RRC, semi-statically provided with values may be overridden using a dynamic indication, etc.).

Additionally or alternatively, the base station 105-a may transmit control signaling, such as DCI signaling, RRC signaling, or a MAC-CE, that includes one or more fields configured to dynamically indicate a configuration for a symbol structure. The base station 105-a may transmit the control information 210 based on a change in one or more communication metrics, scheduling information, a UE capability message, a UE assistance information message, or any combinations thereof.

In some cases, the base station 105-a may transmit control information (e.g., using RRC, one or more MAC-CEs, or DCI) to the UE 115-a that indicates a GI-based symbol structure including one or more formats related to this structure. For example, the GI-based symbol structure may indicate a GI length, a GI type such as a header GI, a tail GI, or both. In some cases, the GI-based symbol structure may indicate that one or more subsets of symbols to not include a GI. In such cases, the communication associated with a particular subset of symbols may be reliably decoded at the UE without FDE, such as for a physical downlink control channel (PDCCH) transmission with a relatively low performance requirement, a physical downlink shared channel (PDSCH) transmission with a relatively low modulation and coding scheme (MCS) (e.g., a MCS that uses a relatively low modulation order, coding rate, or both), or a reference signal for time synchronization, for example. In some cases, the GI-based symbol structure may indicate a receiver DFT window placement (e.g., a normal, delayed, or advanced DFT window within a slot), a receiver DFT window size (e.g., an absolute size or relative to a predefined nominal value), a presence and location of one or more gaps within a symbol, a GI-type (e.g., a zero-tail (ZT) GI or unique word (UW) GI) and its generation method (e.g., the GI added in the time domain after data processing, or the GI included with data prior to data processing), or any combinations thereof. In some cases, different symbols per slot may have different symbol formats.

In some examples, the UE 115-a may transmit a UE capability report to the base station 105-a. The UE capability report may indicate one or more UE capabilities, one or more UE preferences, or both associated with one or more specific symbol structures supported by the UE 115-a according to the one or more UE capabilities, one or more UE preferences, or both. The base station 105-a may transmit the control information 210 indicating a selected symbol structure(s) based on the UE capability report. Additionally or alternatively, the UE 115-a may transmit UE assistance information to the base station 105-a to request a symbol structure. The UE 115-a may request a symbol structure based on a set of configured metrics, thresholds, or other parameters (e.g., rules for selecting a symbol structure) that may be configured for the UE 115-a or indicated to the UE 115-a via control signaling. In some examples, the UE assistance information indicating the requested symbol structure may correspond to an antenna panel or a group of antenna panels at the UE 115-*a*.

The UE 115-*a* may apply the symbol structure indicated via the control information 210 at a time period after receiving the signaling that conveys the control information 210. In some examples, a duration of the time period may be based on a capability of the UE 115-*a*. Additionally or alternatively, the duration of the time period may be indicated via the control information 210 or some other control signaling transmitted to the UE 115-*a*. That is, the UE 115-*a* may insert a gap between receiving the control information 210 and switching a symbol structure for communications in response to the control information 210, for example, to mitigate communication losses, support a latency overhead for performing the switch, or both.

Further, in some cases the control information 210 may indicate an applicability of the symbol structure(s). In some examples, the symbol structure(s) may be applied to any communications between the UE 115-*a* and the base station 105-*a*. Additionally or alternatively, the symbol structure(s) may be applied to a subset of communication types that may be indicated via the control information 210. For example, the symbol structure(s) may be applied to a single UE 115-*a* or multiple UEs, one or more indicated MIMO layers, TCI states, beams, frequency sub-bands (e.g., particular sub-bands or all sub-bands), UE antenna panels (e.g., particular antenna panels or all antenna panels), communications channels, communication directions, or any combinations thereof.

By transmitting and receiving the control information 210, respectively, the base station 105-*a* and the UE 115-*a* may support dynamic switching between symbol structure(s) during communications. In some cases, configuration information (e.g., RRC configuration information) may provide one or more semi-static symbol formats that are to be used, which may be overridden using a dynamic indication (e.g., provided in DCI that schedules a communication). The symbol structure indication transmitted via the control information 210 may provide for reduced latency, improved coordination between devices, and improved communication reliability. In some examples, the dynamic symbol structure switching techniques described herein may provide for improved communications using multiple waveform types in relatively higher frequency bands (e.g., FR2 or higher bands).

Figure 3:
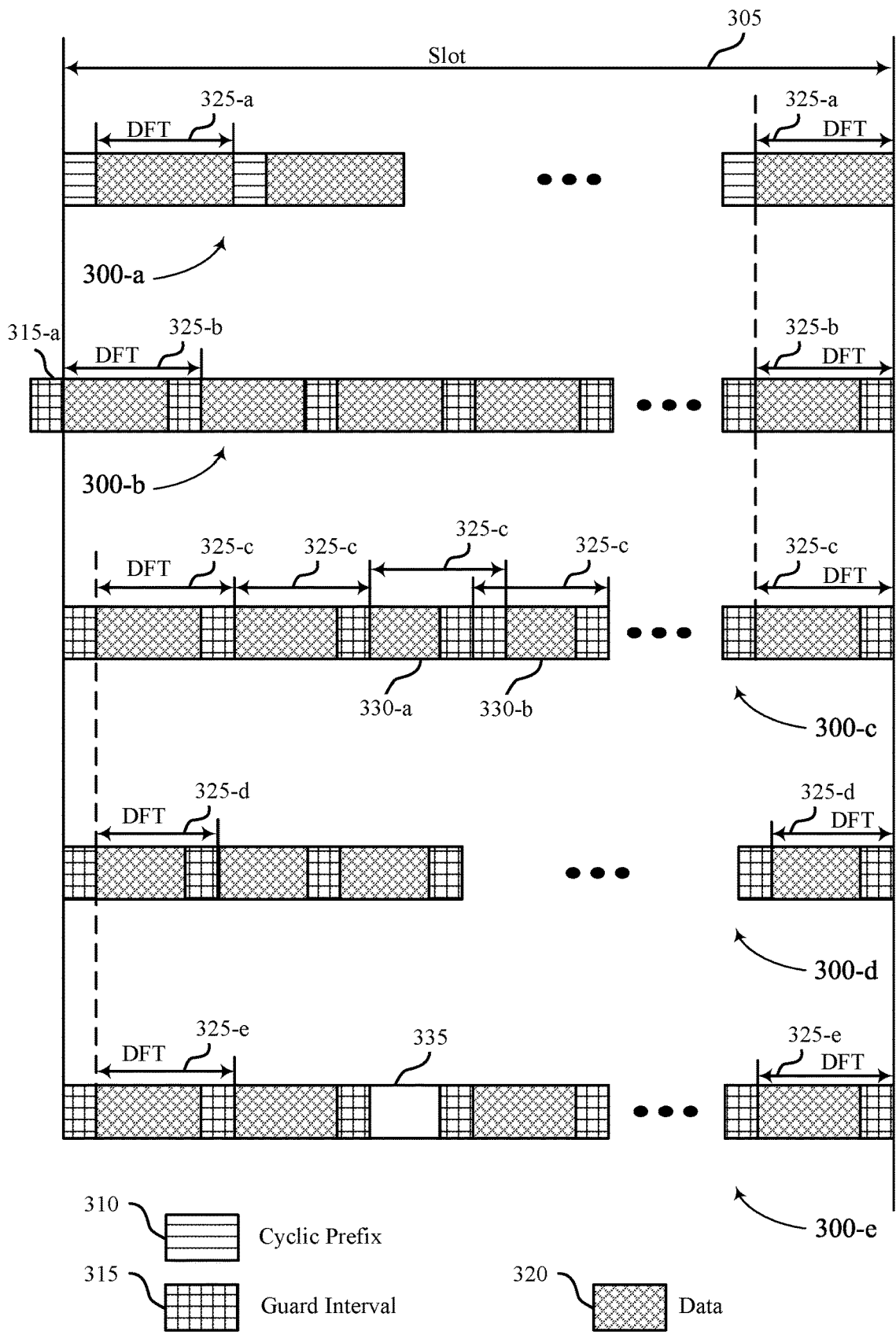
FIG. 3 illustrate examples of symbol structures that support techniques for signaling symbol format for guard interval based waveforms in accordance with aspects of the present disclosure.

FIG. 3 illustrates an example of a symbol formats 300 that supports techniques for signaling symbol format for guard interval based waveforms in accordance with aspects of the present disclosure. The symbol formats 300 may represent example configurations of a slot 305 for communications between a UE 115 and a base station 105. The UE 115 and the base station 105 may be examples of a UE 115 and a base station 105 as described with reference to FIGS. 1 and 2. In some examples, the base station 105 may transmit an indication of a symbol format 300 to the UE 115, as described with reference to FIG. 2. In some examples, the symbol formats 300 may indicate symbol-level alignment across different symbol formats 300, slot-level alignment across different symbol formats 300, GI presence prior to a slot, or some combination thereof for wireless devices operating in a frequency band using the symbol formats 300.

The symbol formats 300 illustrate example configurations of symbols, cyclic prefixes 310, guard intervals 315, additional periods 335 or gaps, or any combination thereof within a subset of symbols that make up slot 305 in this example. As described with reference to FIG. 2, the subset of symbols may represent a slot, sub-slot, subframe, frame, or any other TTI, and one or more symbol structures may be applied to subsets of slots of any duration and that include any quantity of symbols.

As described with reference to FIG. 2, the base station 105 may transmit control signaling (e.g., RRC, DCI, MAC-CE, or any combination thereof) to adapt or switch a symbol structure. The symbol formats 300 illustrated in FIG. 3 may represent examples of CP-based structures and different types of GI-based structures. For example, the symbol format 300-*a* illustrates an example of a CP-based symbol format 300-*a*. The symbol format 300-*b* illustrates an example of a non-slot contained GI-based symbol format 300-*b*. The symbol formats 300-*c*, 300-*d*, and 300-*e* each illustrate examples of slot-contained GI-based symbol formats 300.

The cyclic prefixes 310 or guard intervals 315 in each slot 305 may transform a linear convolution of a transmitted symbol to a circular convolution, which may reduce complexity for a receiver (e.g., by allowing a receiving device to perform a one-tap FDE to decode the symbol). The cyclic prefixes 310 or guard intervals 315 in each symbol of a slot 305 may additionally or alternatively reduce inter-symbol interference and maintain alignment between symbols and slots 305. As described with reference to FIG. 2, different types of waveforms for communications between the UE and the base station may support CP-based symbol formats, GI-based symbol formats, or both. Accordingly, the base station and the UE may switch between CP-based symbols and GI-based symbols based on scheduling information, waveforms used for communications, or other communication metrics.

As indicated, the symbol format 300-*a* may be a CP-based symbol format, and each slot 305 configured according to the symbol format 300-*a* may include a quantity of symbols that each contain data 320 and a corresponding cyclic prefix 310. A cyclic prefix 310 may include a repetition of an ending portion of each symbol. That is, a last few bits or samples of the data 320 in each symbol may be repeated in the cyclic prefix 310 that occurs prior to the symbol in time. Accordingly, the cyclic prefixes 310 may include random data, and a base station may not transmit new information or data via the cyclic prefixes 310. As such, inclusion of the cyclic prefixes 310 may increase overhead but may improve decoding reliability. The cyclic prefix-based symbol format 300-*a* may be a slot-contained format, such that each cyclic prefix 310 and corresponding data 320 may be contained within the slot 305, and interference between slots 305 may be avoided (or otherwise reduced).

A cyclic prefix 310 may be set to one or more different durations. A slot 305 that includes cyclic prefixes 310 having a first duration (e.g., a normal CP duration) may include a first quantity of symbols (e.g., 14 OFDM symbols per slot 305). A slot 305 that includes cyclic prefixes 310 having a second duration that is longer than the first duration (e.g., an extended CP) may include a second quantity of symbols that is less than the first quantity (e.g., 12 OFDM symbols per slot 305). To maintain a fixed DFT window size 325-*a* for the slot 305 (e.g., for performing efficient FFT operations by a UE), the cyclic prefixes 310 may each be the same duration within a slot 305. Using the same cyclic prefix 310 lengths within a slot 305 may reduce overhead and UE complexity associated with modulation, demodulation, or both as compared to a slot including cyclic prefixes 310 having different lengths (e.g., resulting in a change in symbol lengths, a change in DFT window sizes 325, or both within the slot).

The symbol format 300-*b* may be a non-slot contained GI-based symbol format 300-*b*. A slot 305 that is configured according to the symbol format 300-*b* may include a quantity of symbols that each include data 320 (e.g., 15 OFDM symbols per slot 305) and a corresponding guard interval 315. A guard interval 315 for a first symbol in the slot 305 may be included in a prior slot. For example, the guard interval 315-*a* may be included in a slot that occurs before the slot 305 in time. A transmitting device may configure the guard intervals 315 by inserting a sequence of data (e.g., known data) to an end of each symbol in the slot 305 before performing a DFT. As such, the information in each guard interval 315 may be utilized for synchronization, channel estimation, phase tracking, or other applications, which may reduce overhead as compared with cyclic prefix-based symbol formats 300, such as the symbol format 300-*a*.

Due to the insertion of the guard interval 315 before performing DFT, a duration of a guard interval 315 may vary symbol-to-symbol in a slot 305, and the symbol duration and DFT window size 325-*b* may remain constant. The GI-based symbol format 300-*b* may thereby adapt to delay spreads without changing a symbol duration, which may provide for improved communication reliability and reduced latency. A receiving device may perform DFT according to the DFT window size 325-*b* to obtain the data 320 in each symbol, and the receiving device may discard the guard interval 315 or determine information based on a sequence of bits in the guard interval.

In some cases, a slot that is before the slot 305 in time (e.g., slot n−1) may not include data transmissions and corresponding guard intervals 315 (e.g., communications may be limited to a current slot n, or communications in the previous slot may not involve a waveform including guard intervals 315). In such cases, the first symbol in the slot 305 (e.g., slot n) may not have a corresponding guard interval 315 in the prior slot (e.g., the guard interval 315-*a* may not be configured).

The symbol formats 300-*c*, 300-*d*, and 300-*e* represent examples of slot contained GI-based symbol formats 300, in which each segment of data 320 and corresponding guard interval 315 are included in a same slot 305. The symbol formats 300-*c*, 300-*d*, and 300-*e* may be configured according to different symbol sizes, different applied DFT window sizes 325, different guard interval 315 configurations, or any combination thereof as compared to the symbol format 300-*b*. Such differences may provide for the data 320 and guard intervals 315 to be included in the slot 305 (e.g., rather than using a guard interval 315-*a* from a different slot).

The symbol format 300-*c* illustrates a slot contained GI-based symbol format 300-*c* that includes some reduced symbol durations 330-*a* and 330-*b* for two symbols. The symbol format 300-*c* may provide for a wireless device to use a fixed DFT window size 325-*c* in the slot 305. In some examples, the DFT window size 325-*c* may be configured to include a same duration as the DFT window size 325-*a* for the cyclic prefix-based symbol format 300-*a*. A first guard interval 315 for the first symbol in the slot 305 may be included in the slot 305, instead of in a prior slot, as described with reference to the non-slot contained GI-based symbol format 300-*b*. The first guard interval 315 and the remaining guard intervals 315 may be included in a same slot 305 due to some symbols in the slot 305 having the reduced symbol durations 330 and overlapping guard intervals 315. In other words, the symbol format 300-*c* may include a same quantity of symbols (e.g., 15 OFDM symbols) as the non-slot contained guard interval-based symbol format 300-*b*, may include a fixed DFT window size 325-*c*, or both, and may be contained within a same slot 305.

The reduced symbol durations 330 may correspond to symbols that have a shorter length than other symbols in the slot. For example, the reduced symbol durations 330 may include data 320 having fewer bits than data 320 in other symbols in the slot 305. The reduced symbol durations 330 may correspond to two or more guard intervals 315. That is, a guard interval 315 may be repeated across the reduced symbol durations 330 such that the DFT window size 325-*c* may remain fixed while still being preceded by one guard interval 315 and including a second guard interval 315 at the end of the DFT window.

The reduced symbol durations 330 may be located in any symbol of the slot 305 and may include data 320, reference signal transmissions, null resources (e.g., gap periods), other transmissions, or any combination thereof. Although two reduced symbol durations 330-*a* and 330-*b* are illustrated in FIG. 3, it is to be understood that any quantity of symbols may be configured to include a reduced symbol duration 330, and the duration 330 may be any configured time period. The quantity of reduced symbol durations 330 and the length of each reduced symbol duration 330 may be based on a quantity of symbols in the slot 305, a symbol duration, a length of the slot 305, a length of each guard interval 315, or any combination thereof. A configuration for the symbol format 300-*c* may indicate a location and contents of the reduced symbol durations 330.

The symbol format 300-*d* illustrates an example of a slot contained guard interval-based slot 305 that includes a DFT window size 325-*d* and a symbol duration that are different from the DFT window size 325-*a* and symbol duration configured for the CP-based symbol format 300-*a*. Although the DFT window size 325-*d* illustrated in FIG. 3 is shorter than the DFT window size 325-*a*, it is to be understood that, in some examples, the DFT window size 325-*d* may be configured to be larger than the DFT window size 325-*a*. The base station 105 may transmit control signaling indicating a configuration for the symbol format 300-*d*, a duration of the changed DFT window size 325-*d*, a duration of each symbol in the slot, or any combination thereof.

The DFT window size 325-*d* and the symbol duration may be the same for each symbol in the slot 305 in accordance with the symbol format 300-*d*. By supporting the reduced DFT window size 325-*d* and symbol duration, the symbol format 300-*d* may provide for each guard interval 315 and corresponding data 320 to be contained within a same slot 305 while maintaining a same quantity of symbols (e.g., 15 OFDM symbols) in the slot 305 as the non-slot contained guard interval-based symbol format 300-*b*. In some examples, the symbol format 300-*d* may support communications having relatively small data sizes, or applications in which a receiving device is capable of dynamically switching between DFT window sizes 325 between slots 305 (e.g., the receiving device may support a non-nominal DFT window size 325-*d*).

The symbol format 300-*e* illustrates another example of a slot contained guard interval-based slot 305. The symbol format 300-*e* may correspond to a DFT window size 325-*e* that is fixed for each symbol in the slot 305. In some examples, the DFT window size 325-*e* may be the same as the DFT window size 325-*a* for the CP-based symbol format 300-*a*. The symbol format 300-*e* may support containment of each guard interval 315 within the slot 305 by including an additional period 335 or a gap that includes a duration that is different from a duration of each symbol in the slot 305. That is, the symbol format 300-*e* may support transmission of fewer symbols than the non-slot contained GI-based symbol format 300-*b* (e.g., 14 OFDM symbols instead of 15 OFDM symbols). However, the DFT window size 325-*e* and the symbol duration of each symbol in the slot may be the same.

The additional period 335 or gap may be allocated for transmission of a reference signal, a portion of data 320, or some other transmission having a reduced duration. Additionally or alternatively, the additional period 335 or gap may include null resources (e.g., a beam switching gap, an uplink and downlink switching gap, or some other gap period), and the transmitting and receiving devices may refrain from communicating during the gap. If data 320 or a reference signal is transmitted via the additional period 335, a different (e.g., reduced) DFT window size 325 than the DFT window size 325-*e* may be used by a receiving device to demodulate the signal in the additional period 335. As such, the DFT window size 325, in some examples, may not be fixed for each symbol within a slot 305 according to the symbol format 300-*e*. The base station may transmit control signaling to the UE to indicate a configuration for the symbol format 300-*e*. The configuration may indicate a timing and contents of the additional period 335.

Although configurations for five example symbol formats 300 are illustrated, it is to be understood that any quantity of symbol formats 300 corresponding to any set of communication parameters may be supported. Each symbol format 300 may be beneficial for different communication scenarios. As described herein, to improve communication reliability and reduce latency, the base station 105 may signal a symbol structure that may indicate a GI-based symbol format for one or more subsets of a set of symbols, such as one or more of the different types of GI-based symbol formats 300 (e.g., the symbol formats 300-*b*, 300-*c*, 300-*d*, and 300-*e*).

Figure 4A:
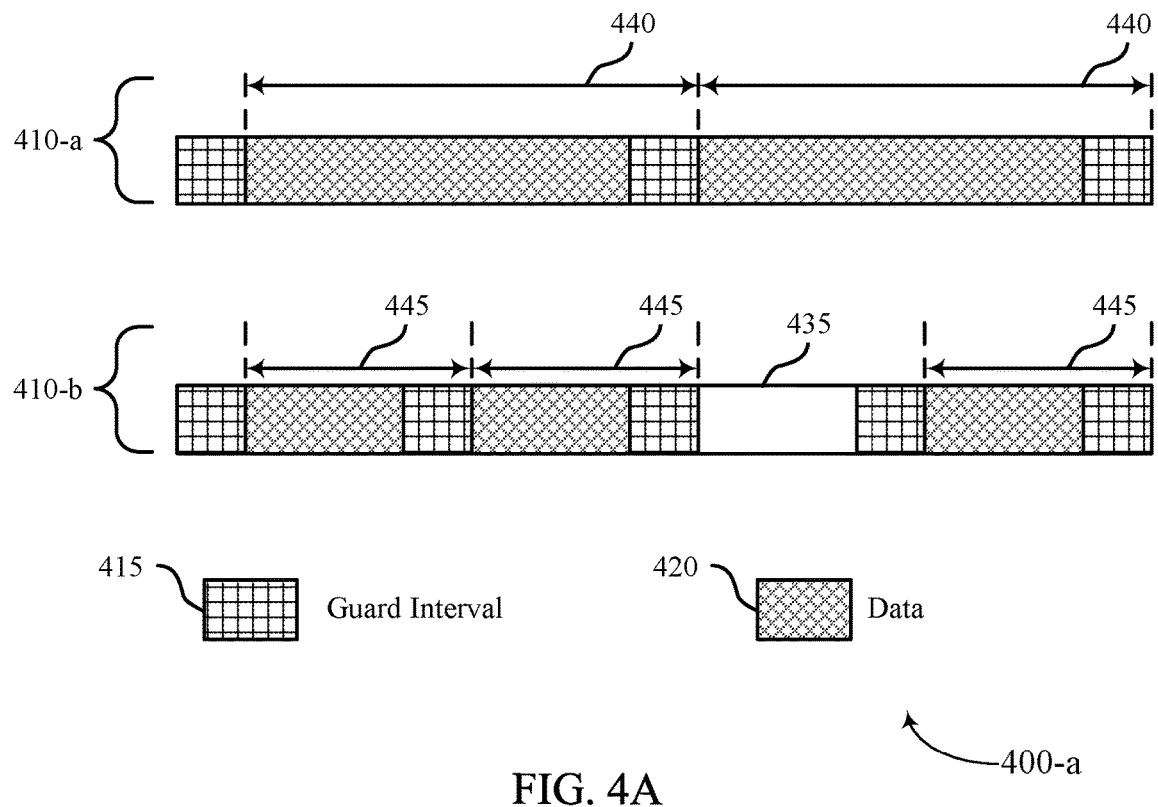
FIGS. 4A and 4B illustrate examples of a communication timelines that supports techniques for signaling symbol format for guard interval based waveforms in accordance with aspects of the present disclosure.
Figure 4B:
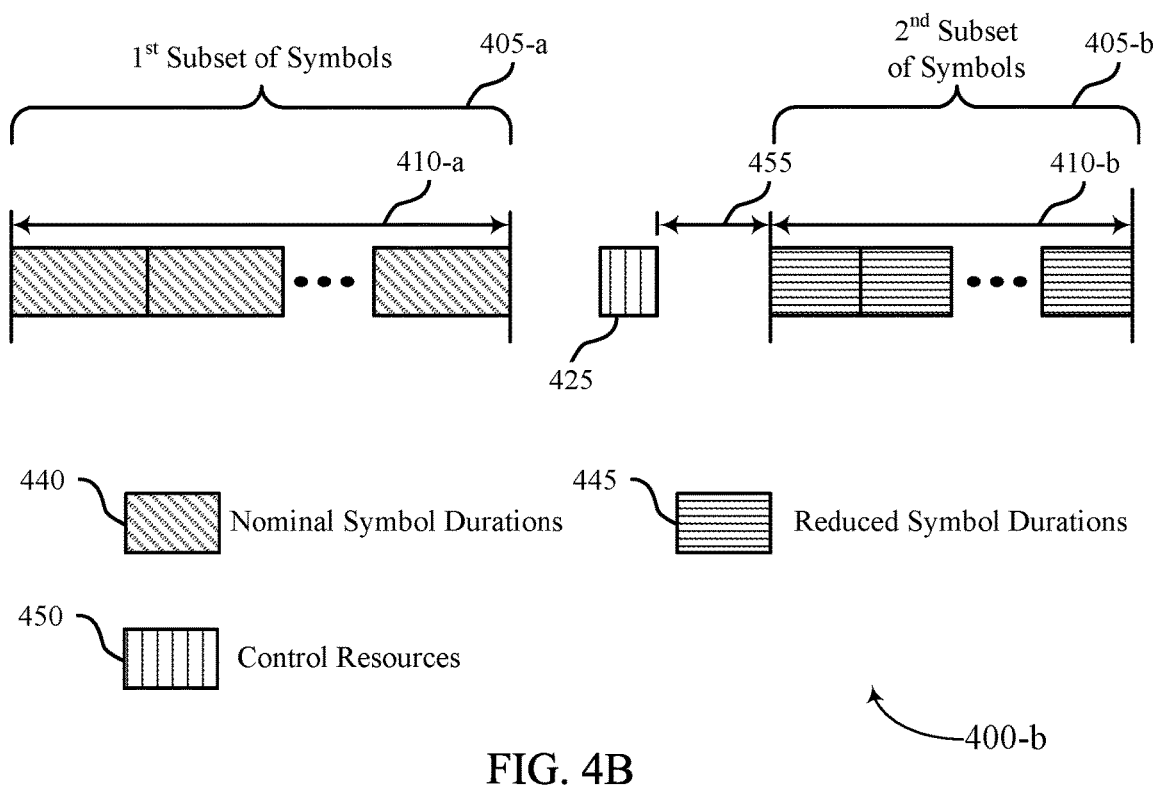

FIGS. 4A and 4B illustrate examples of a communication timelines 400-*a* and 400-*b* that support techniques for signaling symbol format for guard interval based waveforms in accordance with aspects of the present disclosure. The communication timelines 400-*a* and 400-*b* illustrate example communications between a UE and a base station according to different symbol structures 410. The UE and the base station may be examples of a UE 115 and a base station 105 as described with reference to FIGS. 1 through 3. In some examples, the UE and the base station may switch between communications according to a first symbol structure 410-*a* that includes symbols having nominal symbol durations 440 and a second symbol structure 410-*b* that includes symbols having symbol durations 445 that are shorter than the nominal symbol durations 440.

The base station may transmit control signaling to indicate a symbol structure 410, as described with reference to FIGS. 2 and 3. In some examples, the indication of the symbol structure may indicate a change of a symbol size or duration within a slot. That is, the base station and the UE may switch between communicating according to a first symbol duration 440 in a first subset of symbols to communicating according to a second symbol duration 445 in a second subset of symbols. The second symbol duration 445 may be greater than or less than the first symbol duration 440. The base station and the UE may switch between symbol durations to support low latency traffic, to reduce UE complexity, to support beam switching, to support reference signal transmissions, or any combination thereof.

In some examples, the UE and the base station may support URLLC. The URLLC traffic may include delay sensitive data traffic and relatively small payload sizes. As such, relatively short symbol sizes may provide for the UE and the base station to communicate the short data bursts relatively quickly (e.g., to satisfy a URLLC latency threshold). That is, the UE and the base station may TDM a PDSCH signal and a PDCCH signal in relatively short succession. To support URLLC data traffic, the base station may transmit control signaling to the UE to indicate the symbol structure 410-*b*, or some other symbol structure 410, that supports the reduced symbol durations 445.

In some other examples, an SCS for communications between the UE and the base station may be relatively large, which may provide for a reduced symbol time (e.g., and a reduced slot duration). The reduced symbols may provide for a receiver to perform more DFT operations within a given time period than if the SCS is lower, which may increase UE complexity. In some such cases, the UE (e.g., or another receiving device) may perform single tap FDE operations, or other efficient DFT techniques. Accordingly, at relatively high operating frequency bands, a UE may support varying processing loads and increased UE complexity (e.g., due to scheduling activity, MIMO layers, beam management, radio frequency (RF) parameters, or the like). To adapt to changing UE complexity, the base station as described herein may transmit the control signaling to switch between symbol structures 410 for different subsets of a set of symbols that support varying symbol durations.

FIG. 4A illustrates an example communication timeline 400-*a*. The communication timeline 400-*a* illustrates a portion of a first symbol structure 410-*a* and a second symbol structure 410-*b*. The first and second symbol structures 410 illustrate a subset of symbols and guard intervals 415 within a portion of a slot. The symbol structures 410 may be guard interval-based symbol structures 410 including the guard intervals 415 (or CP-based slot formats). That is, the symbol structures 410 may be examples of any of the formats described with reference to FIG. 3. The symbol structures 410 may additionally or alternatively correspond to different symbol durations. The base station may transmit control signaling to the UE to indicate a configuration for the symbol structures 410.

In the example of FIG. 4A, a first symbol structure configuration may indicate a first symbol duration 440 for the first symbol structure 410-*a* and a second symbol structure configuration may indicate a second symbol duration 445 for the second symbol structure 410-*b*. In some examples, the first symbol duration 440 may be a nominal or default symbol duration. For example, the UE and the base station may be configured to communicate according to the nominal symbol duration 440 (e.g., a pre-defined symbol duration 440, such as for a specific frequency band). As described herein, the base station may indicate a symbol duration 445 that is different than the nominal symbol duration 440 to be used for communications in one or more slots. The base station may indicate the different symbol duration 445 based on one or more communication parameters, for example. The symbol structure 410-*b* may be configured to support the reduced symbol duration 445 that is less than the nominal symbol duration 440, which may support an increased quantity of symbols in a slot. That is, as the symbol duration 445 is decreased from the nominal symbol duration 440, the quantity of symbols in the slot may increase.

The reduced symbol duration 445 may support resources that may be allocated for alternative uses in a slot. As such, a slot that is configured according to the symbol structure 410-*b* to include symbols having the reduced symbol duration 445 may include an additional period 435 or gap. The base station may indicate a location and contents of the additional period 435 to the UE via the configuration for the symbol structure 410-b, or via other control signaling. The additional period 435 may be used for transmission of data 420, one or more reference signals, or both. Additionally or alternatively, the additional period 435 may be a gap period that may include null resources (e.g., empty resources).

FIG. 4B illustrates an example communication timeline 400-b that includes a switch between the first symbol structure 410-a and the second symbol structure 410-b. In the example of the communication timeline 400-b, the UE 115 and the base station 105 may communicate in a first subset of symbols 405-a configured according to the first symbol structure 410-a, and the UE and the base station may switch to communications in a second subset of symbols 405-b configured according to the second symbol structure 410-b. In this example, the UE and the base station may perform the switch after a time period 455.

The base station may transmit control signaling 425, such as DCI signaling, RRC signaling, a MAC-CE, or some other control signaling 425, via the control resources 450. The control signaling 425 may include a configuration message that indicates the second symbol structure 410-b. The UE and the base station may apply the switch after the time period 455, which may be indicated to the UE via the control signaling 425, may be based on a UE capability, or both.

Figure 5:
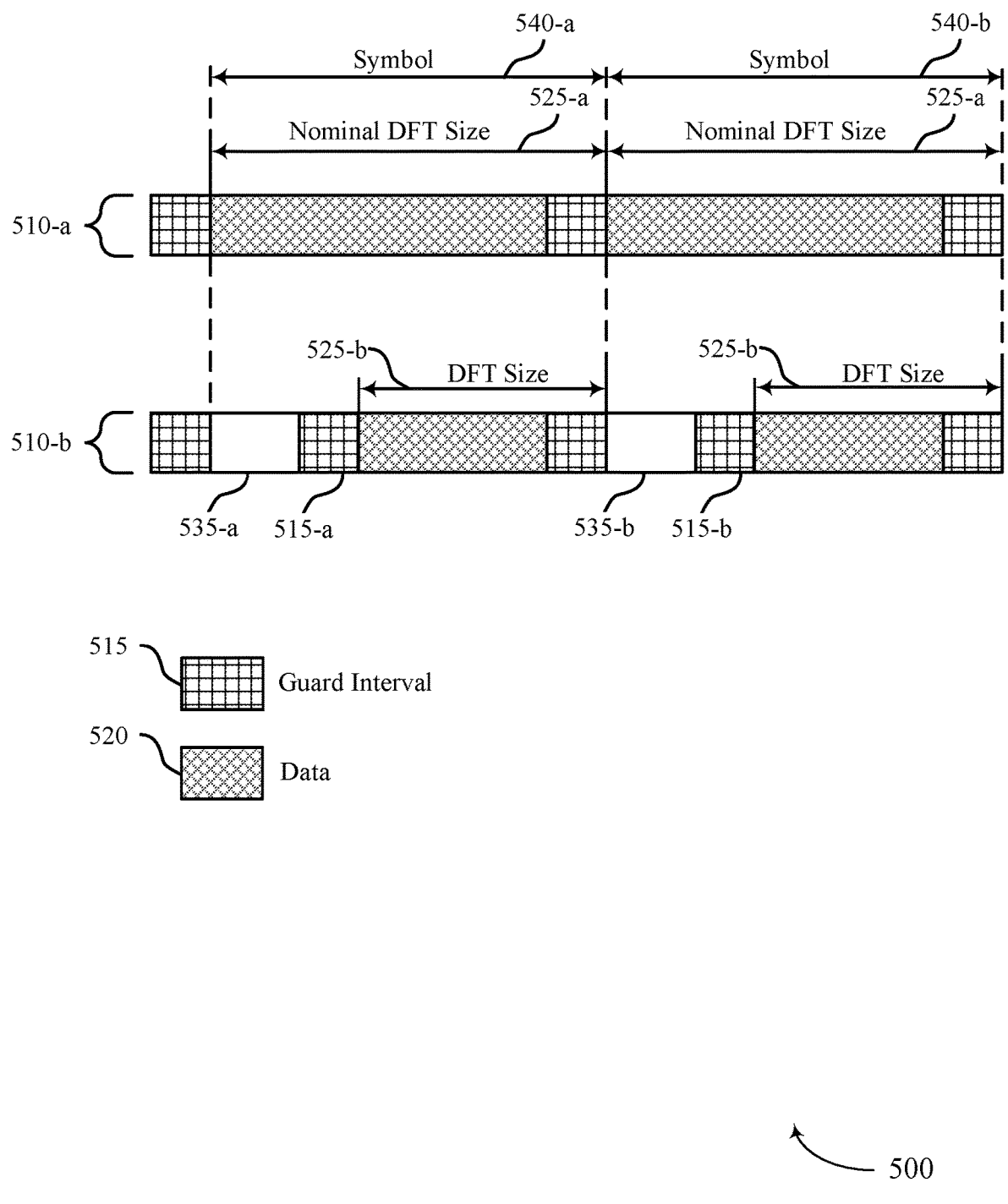
FIG. 5 illustrates an example of a discrete Fourier transform (DFT) window configuration that supports techniques for signaling symbol format for guard interval based waveforms in accordance with aspects of the present disclosure.

FIG. 5 illustrates an example of a DFT window configuration 500 that supports techniques for signaling symbol format for guard interval based waveforms in accordance with aspects of the present disclosure. The DFT window configuration 500 illustrates example configurations of symbol structures 510-a and 510-b that correspond to different configurations of DFT window sizes 525. The symbol structures 510-a and 510-b may represent examples of the symbol structures as described with reference to FIGS. 2 and 3. In some examples, a UE and a base station may configure communications according to the first symbol structure 510-a that corresponds to a nominal DFT window size 525-a and a second symbol structure 510-b that corresponds to a different DFT window size 525-b.

The base station may transmit control signaling to indicate a symbol structures 510, as described with reference to FIGS. 2 through 4. In some examples, the indication of the symbol structures 510 may indicate a DFT window size 525 within a subset of symbols. That is, the base station and the UE may configure a first DFT window size 525-a in each symbol 540 of a first subset of symbols, and a second DFT window size 525-b in each symbol 540 of a second subset of symbols. The second DFT window size 525-b may be greater than or less than the first DFT window size 525-a.

In some cases, the base station may transmit control signaling to indicate a configuration for a symbol structure 510-a corresponding to a nominal DFT window size 525-a and a symbol structure 510-b corresponding to a reduced DFT window size 525-b to support communications. Although the symbol structures 510-a and 510-b are illustrated as GI-based symbol structures 510 including the guard intervals 515, it is to be understood that the symbol structures 510-a and 510-b may be any type of GI-based symbol structures 510 or CP-based symbol structures.

The symbol structure 510-a may support a nominal DFT window size 525-a. In some examples, the nominal DFT window size 525-a may include a duration that is the same as a duration of each symbol 540. Each symbol 540 configured according to the symbol structure 510-a may include data 520 and a corresponding guard interval 515 (or cyclic prefix). The symbol structure 510-b may support a DFT window size 525-b that may be different from (e.g., greater than or less than) the nominal DFT window size 525-a. In the example of FIG. 5, the DFT window size 525-b is less than the nominal DFT window size 525-a. The reduced DFT window size 525-b may include data 520 and a corresponding guard interval 515 (or cyclic prefix). To support the reduced DFT window size 525-b while maintaining a same symbol duration (e.g., to ensure alignment between symbols 540 and slots), each symbol 540 in the slot may be configured to include an extra guard interval 515 or cyclic prefix, an additional period 535 (e.g., gap), or both.

To provide for an extra guard interval 515 (e.g., the guard intervals 515-a and 515-b) prior to the DFT window, the DFT window size 525-b may be less than the nominal DFT window size 525-a by a duration that is greater than or equal to a duration of a guard interval 515. The extra guard intervals 515-a and 515-b may maintain a circular convolution for the reduced DFT window size 525-b. For example, the symbol 540-a may include the extra guard interval 515-a prior to the data 520 and the symbol 540-b may include the extra guard interval 515-b prior to the data 520 to support a circular convolution. In some examples, the symbol 540-a may additionally or alternatively include the additional period 535-a, and the symbol 540-b may include the additional period 535-b. The additional periods 535 may be allocated for transmission of a reference signal, time and frequency synchronization, or both. Additionally or alternatively, the additional periods 535 may include null resources and may be allocated as gap periods for beam switching, other switching periods, for micro-sleep to conserve power, or any combination thereof.

FIGS. 6A through 6C illustrate examples of symbol structures 600 that supports techniques for signaling symbol format for guard interval based waveforms in accordance with aspects of the present disclosure. The symbol structures 600 illustrate example symbol structures 600-a through 600-c that correspond to different configurations of symbol formats. The symbol structures 600-a through 600-c may represent examples of the symbol structures as described with reference to FIGS. 2 through 5.

In some examples, as illustrated in FIG. 6A, a UE and a base station may configure communications according to a first symbol structure 600-a that may be used for one or more subsets of a set of symbols (e.g., one or more slots, sub-slots, subframes, etc.). In this example, the first symbol structure 600-a may configure symbols within a first window 605 that include a first symbol 625-a without a guard interval prior to a slot 610 for transmission of data 620 in symbols 625-b through 625-c. In this example, each of the symbols 625-b through 625-c include a tail guard interval 615-a.

In the example of FIG. 6B, a UE and a base station may configure communications according to a second symbol structure 600-b that may be used for one or more subsets of a set of symbols (e.g., one or more slots, sub-slots, subframes, etc.). In this example, the second symbol structure 600-b may be a non-slot aligned structure that includes a guard interval 615-b that precedes a slot/window 630 that contains the subset of symbols of the second symbol structure 600-b. The second symbol structure 600-b may include multiple symbols 625 that may have different GIs or no GIs, such as first symbol 635-a that includes a tail guard interval 615-c, and a second symbol 635-b that contains no GI. In this example, the second symbol 635-b and a third symbol 635-c may be in a group of symbols 640 with reduced performance targets in which TDE may be performed with sufficient reliability to decode data 620. For example, the group of symbols 640 may include PDCCH data that is transmitted at a lower modulation order, a lower coding rate, or any combinations thereof.

In the example of FIG. 6C, a UE and a base station may configure communications according to a third symbol structure 600-*c* that may be used for one or more subsets of a set of symbols (e.g., one or more slots, sub-slots, subframes, etc.). In this example, the third symbol structure 600-*c* may be a slot aligned structure within a slot/window 645 that includes a first symbol 650-*a* having a header guard interval 615, a second symbol 650-*b* having a header guard interval 615, and a third symbol 650-*c* having a tail guard interval 615. In this example, the second symbol 650-*b* and third symbol 650-*c* may be in a group of symbols 655 with reduced performance targets in which TDE may be performed with sufficient reliability to decode data 620. For example, the group of symbols 655 may include PDCCH data that is transmitted at a lower modulation order, a lower coding rate, or any combinations thereof.

Figure 7A:
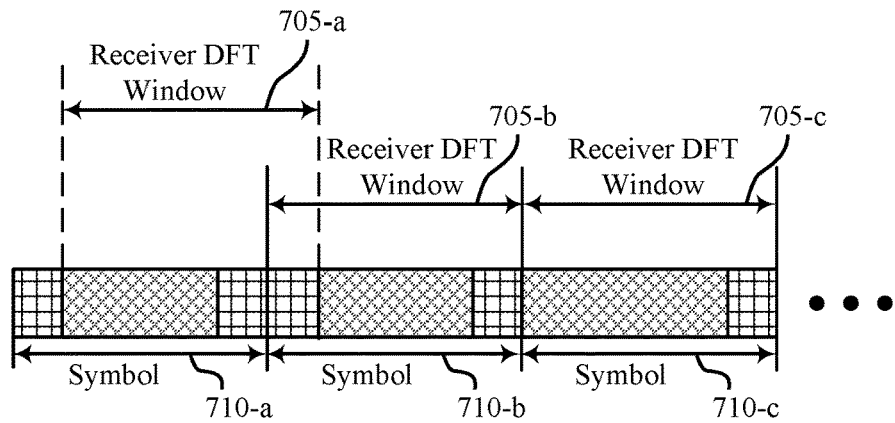
FIGS. 7A through 7C illustrate examples of DFT windows in guard interval-based symbol formats that support techniques for signaling symbol format for guard interval based waveforms in accordance with aspects of the present disclosure.
Figure 7B:
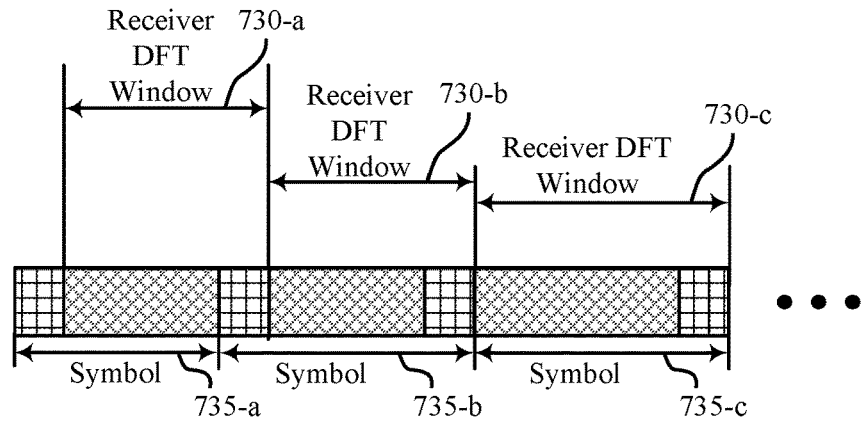
Figure 7C:
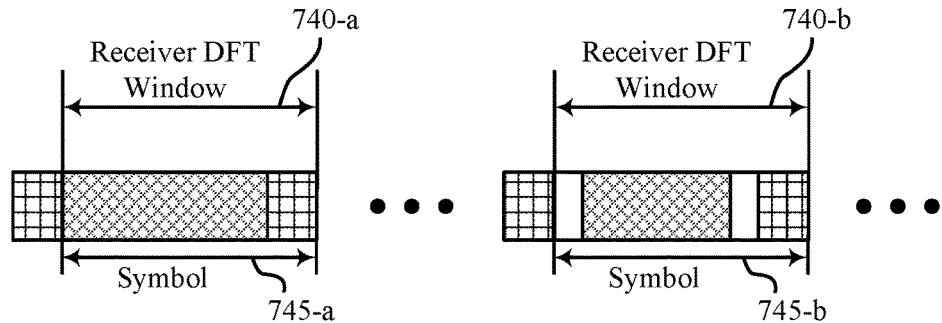

FIG. 7A through 7C illustrate examples of DFT windows in guard interval-based symbol structures 700 that support techniques for signaling symbol format for guard interval based waveforms in accordance with aspects of the present disclosure. The DFT windows in guard interval-based symbol structures 700 illustrate example symbol structures 700-*a* through 700-*c* that correspond to different configurations of symbol formats. The symbol structures 700-*a* through 700-*c* may represent examples of the symbol structures as described with reference to FIGS. 2 through 6.

In some examples, as illustrated in FIG. 7A, a UE and a base station may configure communications according to a first symbol structure 700-*a* that may be used for one or more subsets of a set of symbols (e.g., one or more slots, sub-slots, subframes, etc.). In this example, the first symbol structure 700-*a* may configure symbols with a first receiver DFT window 705, in which a first receiver DFT window 705-*a* may be delayed relative to a start time of a first symbol 710-*a*. In this example, a second receiver DFT window 705-*b* and a third receiver DFT window 705-*c* may have a normal start time that is aligned with a start of the respective second symbol 710-*a* and third symbol 710-*c*. In other examples, a receiver DFT window 705 may be advanced relative to a symbol 710 (e.g., for a shortened symbol the receiver DFT window 705 may be advanced in order to contain a guard interval 715 in advance of data 720 in the symbol 710.

In the example of FIG. 7B, a UE and a base station may configure communications according to a second symbol structure 700-*b* that may be used for one or more subsets of a set of symbols (e.g., one or more slots, sub-slots, subframes, etc.). In this example, the second symbol structure 700-*b* may include one or more receiver DFT windows 730 that have different sizes. In this example, a first receiver DFT window 730-*a* may have a first duration and start time for a first symbol 735-*a*, a second receiver DFT window 730-*b* may have a second duration and start time for a second symbol 735-*b* (e.g., which may be shorter than the first duration), and a third receiver DFT window 730-*c* may have the first duration and start time for the third symbol 735-*c*.

In the example of FIG. 7C, a UE and a base station may configure communications according to a third symbol structure 700-*c* that may be used for one or more subsets of a set of symbols (e.g., one or more slots, sub-slots, subframes, etc.). In this example, the third symbol structure 700-*c* may include one or more receiver DFT windows 740 that have the same or different sizes for one or more symbols 745. In this example, a first symbol 745-*a* may not include any gaps, and a second symbol 745-*b* may include gaps 725. In such examples, the control information that indicates the third symbol structure 700-*c* may include information on the existence and location of gaps 725 within one or more symbols (e.g., in second symbol 745-*b*).

Figure 8A:
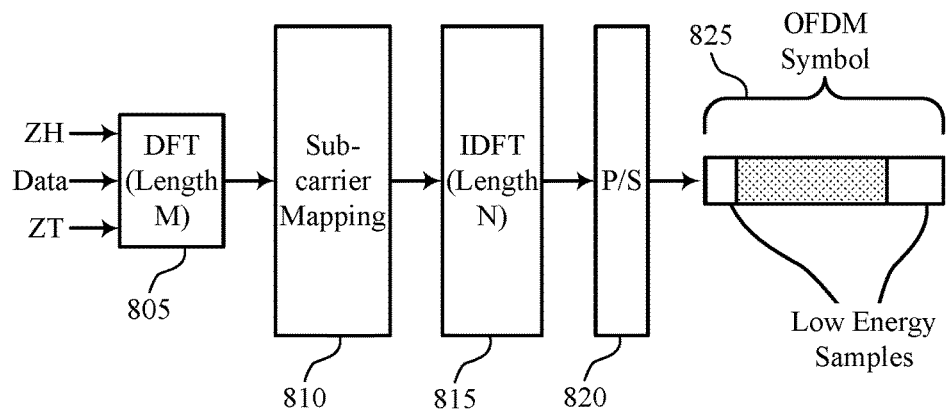
FIGS. 8A through 8C illustrate examples of guard interval configurations that support techniques for signaling symbol format for guard interval based waveforms in accordance with aspects of the present disclosure.
Figure 8B:
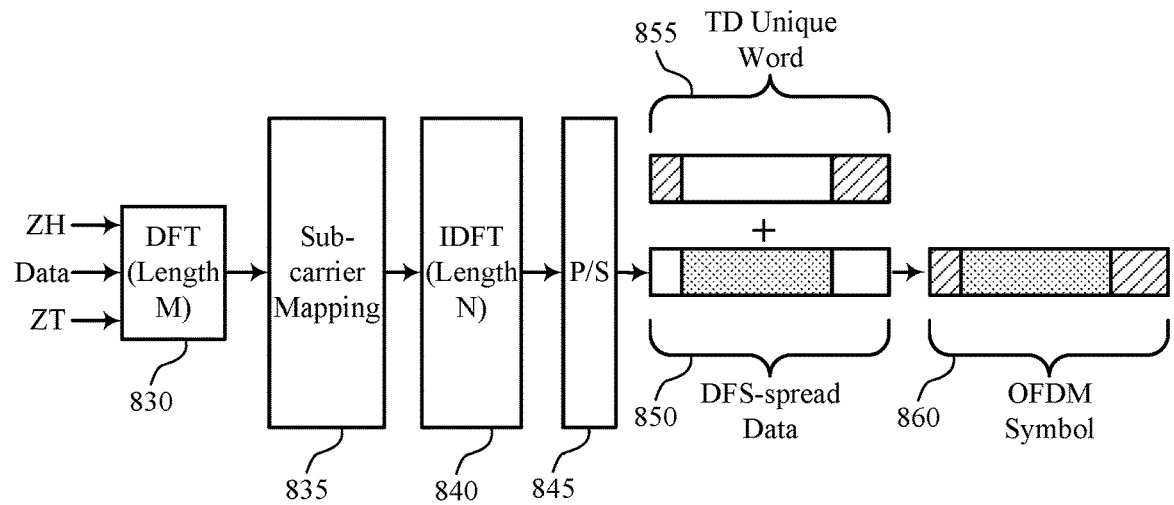
Figure 8C:
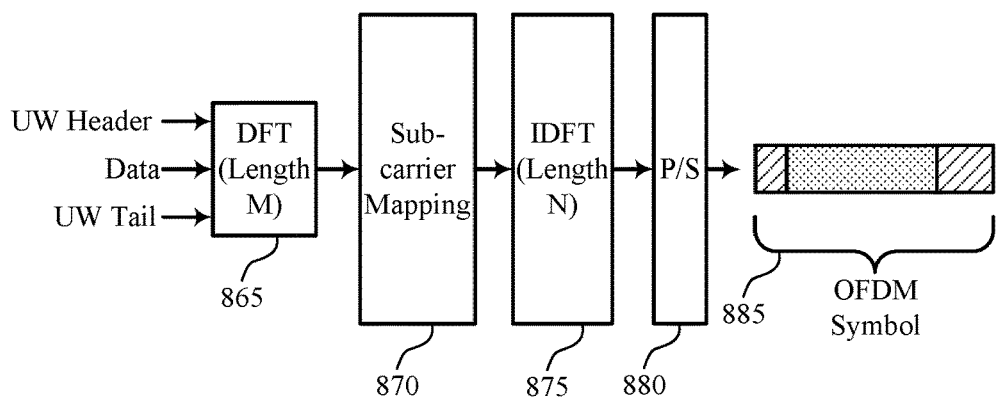

FIGS. 8A through 8C illustrate examples of guard interval configurations 800 that support techniques for signaling symbol format for guard interval based waveforms in accordance with aspects of the present disclosure. The guard interval configurations 800 illustrate example symbol configurations 800-*a* through 800-*c* that correspond to different configurations of symbol formats. The configurations 800-*a* through 800-*c* may represent examples of GI generation methods for symbol structures as described with reference to FIGS. 2 through 7.

In the example of FIG. 8A, a zero head (ZH) and zero tail (ZT) GI may be used, in which null bits (e.g., zeros) for the ZH and ZT may be provided along with data to a DFT component 805, for DFT (e.g., having length M). The transformed data, ZT and ZH may be provided to a sub-carrier mapping component 810 for mapping to sub-carriers, and then to an IDFT component 815 for IDFT (e.g., having length N). The output of IDFT component 815 may be provided to parallel-to-serial (P/S) component 820 to provide a DFT-s-OFDM symbol 825 having ZH and ZT (e.g., low energy samples) as the GI for the OFDM symbol 825.

In the example of FIG. 8B, time domain (TD) unique word (UW) may be used for the GI, in which the UW may provide some information or data to a receiving device (e.g., the receiving device may blind decode two or more hypotheses of the UW to identify which was used, where each potential UW is mapped to one or more information bits). In this example, null bits (e.g., zeros) for the ZH and ZT may be provided along with data to a DFT component 830, for DFT (e.g., having length M). The transformed data, ZT and ZH may be provided to a sub-carrier mapping component 835 for mapping to sub-carriers, and then to an IDFT component 840 for IDFT (e.g., having length N). The output of IDFT component 840 may be provided to P/S component 845 to provide a DFT-s-OFDM data 850 having ZH and ZT (e.g., low energy samples). In this example, the TD UW 855 may be inserted in the time domain into the low energy samples, to generate the OFDM symbol 860 with UW GI.

In the example of FIG. 8C, a UW may be used for the GI, where the UW is DFT-spread along with data for the symbol. In this example, a UW header and UW tail may be provided along with data to a DFT component 865, for DFT (e.g., having length M). The transformed data, UW header and UW tail may be provided to a sub-carrier mapping component 870 for mapping to sub-carriers, and then to an IDFT component 875 for IDFT (e.g., having length N). The output of IDFT component 875 may be provided to P/S component 880 to provide a DFT-s-OFDM symbol 885 having a UW GI.

Figure 9:
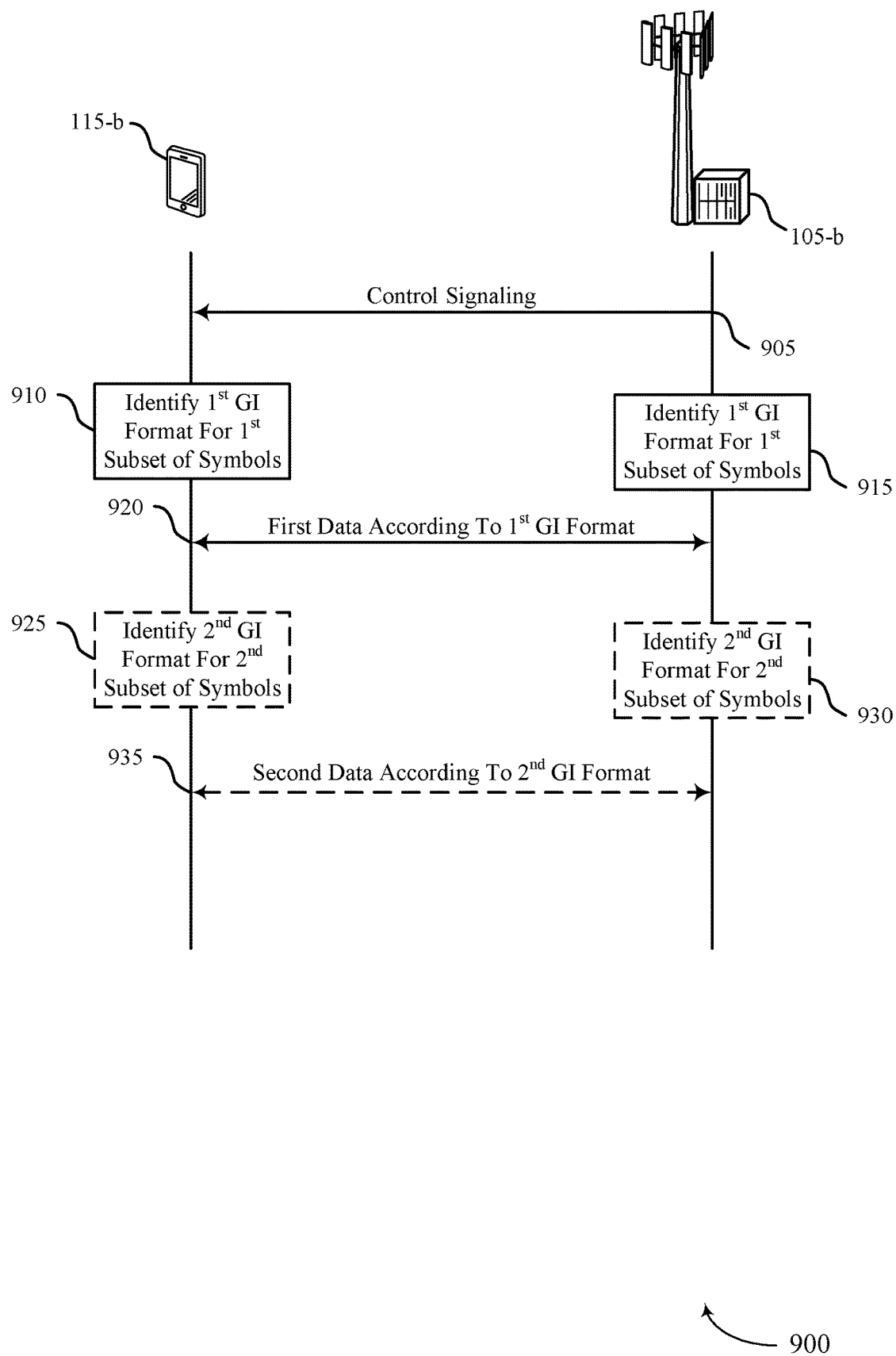
FIG. 9 illustrates an example of a process flow that supports techniques for signaling symbol format for guard interval based waveforms in accordance with aspects of the present disclosure.

FIG. 9 illustrates an example of a process flow 900 that supports techniques for signaling symbol format for guard interval based waveforms in accordance with aspects of the present disclosure. The process flow 900 may include various aspects of the present disclosure described with reference to FIGS. 1 through 8. For example, the process flow 900 may illustrate communications between a UE 115-*b* and a base station 105-*b*, which may be examples of corresponding devices as described with reference to FIGS. 1 through 8. In some examples, the base station 105-*b* may transmit a configuration for one or more symbol structures for one or more subsets of a set of symbols to the UE 115-*b* to support reduced latency, complexity, and improved communication reliability. Alternative examples of the following may be implemented, where some steps are performed in a different order than described or are not performed at all. In some cases, a step may include additional features not mentioned below, or further steps may be added.

At 905, the base station 105-*b* may transmit control signaling to the UE 115-*b*. The control signaling may provide control information that indicates a symbol structure for a set of symbols, the symbol structure including a symbol format of a plurality of symbol formats for one or more subsets of the set of symbols. In some cases, the control information indicates one or more of a GI length, GI type, a receiver DFT window placement relative to a symbol boundary (e.g., normal, delayed, or advanced), a receiver DFT window size (e.g., as an absolute DFT window size, as an indication of a selected DFT window size from a set of available DFT window sizes, as a DFT window size relative to a default size, or any combinations thereof), an indication of one or more gaps within one or more symbols (a presence or absence of one or more gaps associated with a GI within a symbol, gap duration, or both), or any combinations thereof, for one or multiple subsets of symbols. In some cases, the GI type indicates a header GI in which a GI precedes data within a symbol, a tail GI in which data precedes a GI within the symbol, both a header and tail GI, or that no GI is present in a symbol. Further, in some cases, the GI type indicates a ZH, ZT, or UW GI, a GI generation technique, or any combinations thereof. In some cases, the control signaling is provided in one or more of RRC signaling, a MAC-CE, DCI, or any combinations thereof.

In some cases, the control information includes one or more fields that include a symbol format indicator for each of the one or more subsets of the set of symbols. In some cases, the symbol format indicator may be configured via RRC signaling and a subsequent indicator provided in DCI or a MAC-CE can indicate a temporary change in the symbol structure. In some cases, the control information is provided for one or more UEs, one or more beams, one or more sub-bands, one or more UE antenna panels, one or more channels, or any combinations thereof. In some cases, the control information indicates the symbol format for each symbol of a set of symbols, or indicates a mapping between symbol formats of the one or more subsets of the set of symbols and one or more transmission parameter. The symbol structure may be applied across all symbols after the receiving the control information, may be applied according to a pattern of sets of symbols, may be applied for a configured time period, may be applied for one or more slots or sub-slots, or any combinations thereof. In some cases, the UE 115-*b* may transmit a capability report to the base station 105-*b*, and the control information indicating the symbol structure is provided based at least in part on the UE capability report.

At 910, the UE 115-*b* may identify a first GI format for a first subset of symbols, based at least in part on the control signaling. At 915, the base station 105-*b* identify the first GI format for the first subset of symbols, based at least in part on the control signaling. In some cases, the first GI format may be applied to the symbol structure for the first set of symbols that start at a time period after the control information is received at the UE 115-*b*. In some cases, the time period may be indicated by the control information, may be based at least in part on a UE capability, or any combinations thereof.

At 920, the UE 115-*b* and the base station 105-*b* may communicate first data during at least a first subset of symbols in accordance with a first GI format. The data may be uplink data, downlink data, or both.

Optionally, at 925, the UE 115-*b* may identify a second GI format for a second subset of symbols, based at least in part on the control signaling, and 930, the base station 105-*b* identify the second GI format for the second subset of symbols, based at least in part on the control signaling. At 935, the UE 115-*b* and the base station 105-*b* may communicate second data during at least a second subset of symbols in accordance with a second GI format. The data may be uplink data, downlink data, or both.

In some examples, the UE 115-*b* and the base station 105-*b* may begin communicating a time period after receiving the control signaling. The time period may be indicated by the control signaling, may be based on a UE capability, or both. In some cases, the control signaling may indicate an applicability of the symbol formats. For example, the first GI format may apply to one or more MIMO layers, TCI states, frequency sub-bands, UE antenna panels, or any combination thereof, and the second GI format may apply to one or more different MIMO layers, TCI states, frequency sub-bands, UE antenna panels, or any combination thereof.

Figure 10:
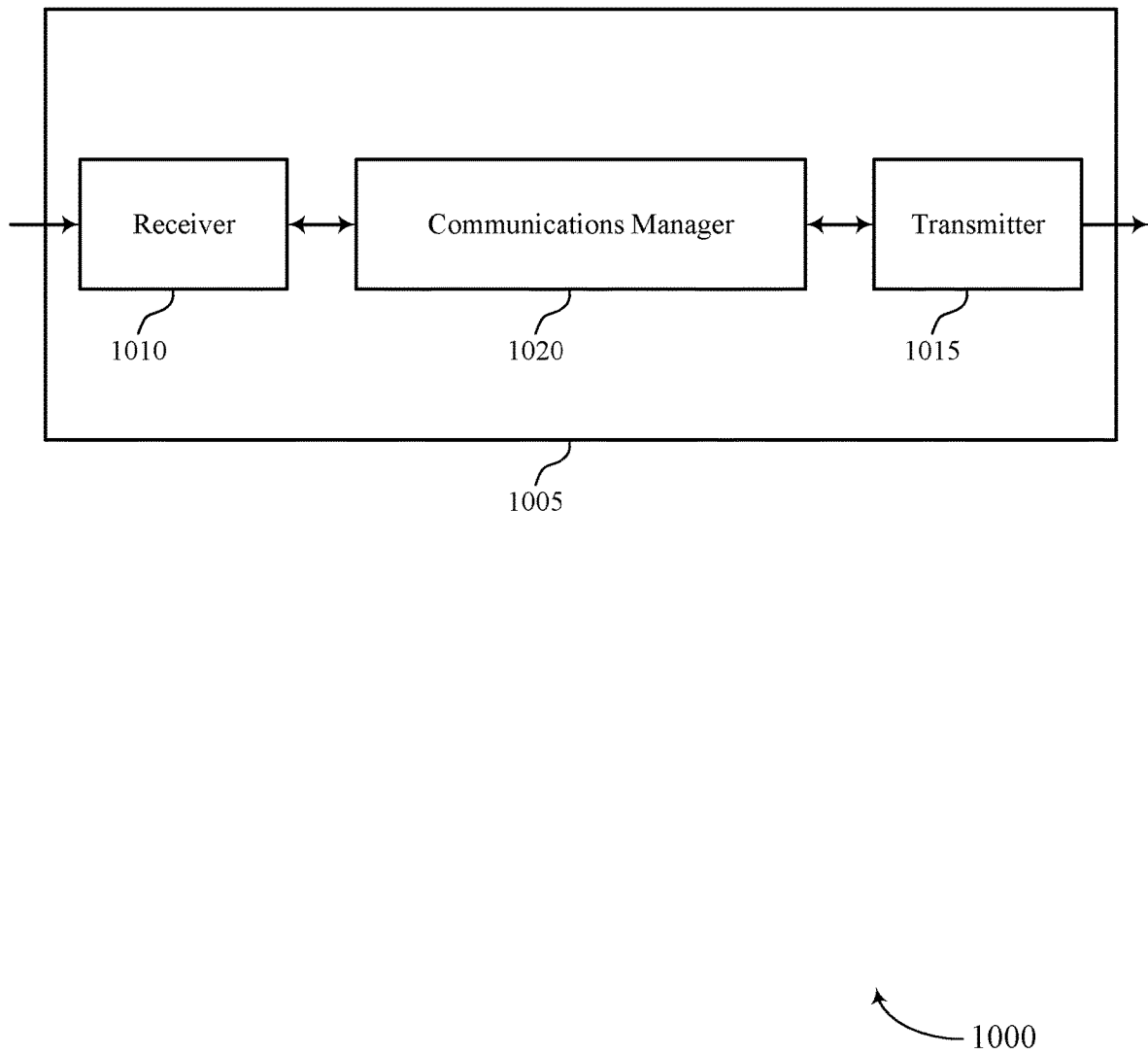
FIGS. 10 and 11 show block diagrams of devices that support techniques for signaling symbol format for guard interval based waveforms in accordance with aspects of the present disclosure.

FIG. 10 shows a block diagram 1000 of a device 1005 that supports techniques for signaling symbol format for guard interval based waveforms in accordance with aspects of the present disclosure. The device 1005 may be an example of aspects of a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for signaling symbol format for guard interval based waveforms). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for signaling symbol format for guard interval based waveforms). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of techniques for signaling symbol format for guard interval based waveforms as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a UE in accordance with examples as disclosed herein. For example, the communications manager 1020 may be configured as or otherwise support a means for receiving, from a base station, control information indicating a symbol structure for a set of symbols, the symbol structure including a symbol format of a set of multiple symbol formats for one or more subsets of the set of symbols. The communications manager 1020 may be configured as or otherwise support a means for identifying, based on the symbol format of the set of multiple symbol formats, a first guard interval format of a first subset of the set of symbols. The communications manager 1020 may be configured as or otherwise support a means for communicating with the base station during the first subset of symbols in accordance with the first guard interval format.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for reduced processing overhead, reduced power consumption, and more efficient utilization of communication resources. By receiving control information indicating a symbol structure, the device 1005 may support symbol structures for different subsets of symbols that have different GI configurations, different CP formats, different symbol durations, different DFT window sizes, different gap configurations, or any combinations thereof. Such techniques may provide for reduced latency and reduced processing by the processor of the device 1005, more efficient utilization of communication resources, and enhanced reliability for communications.

Figure 11:
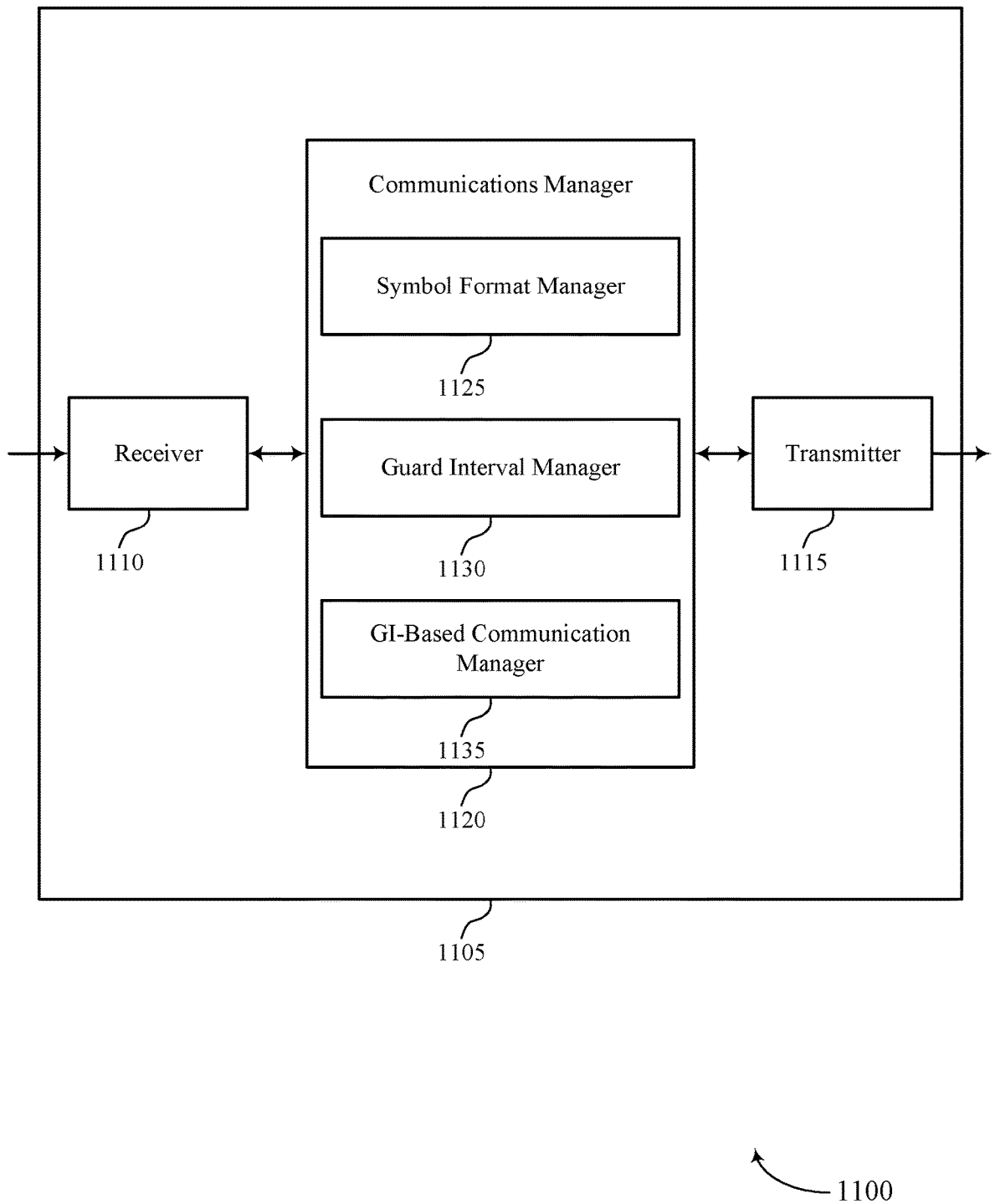

FIG. 11 shows a block diagram 1100 of a device 1105 that supports techniques for signaling symbol format for guard interval based waveforms in accordance with aspects of the present disclosure. The device 1105 may be an example of aspects of a device 1005 or a UE 115 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to techniques for signaling symbol format for guard interval based waveforms). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to techniques for signaling symbol format for guard interval based waveforms). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of techniques for signaling symbol format for guard interval based waveforms as described herein. For example, the communications manager 1120 may include a symbol format manager 1125, a guard interval manager 1130, a GI-based communication manager 1135, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a UE in accordance with examples as disclosed herein. The symbol format manager 1125 may be configured as or otherwise support a means for receiving, from a base station, control information indicating a symbol structure for a set of symbols, the symbol structure including a symbol format of a set of multiple symbol formats for one or more subsets of the set of symbols. The guard interval manager 1130 may be configured as or otherwise support a means for identifying, based on the symbol format of the set of multiple symbol formats, a first guard interval format of a first subset of the set of symbols. The GI-based communication manager 1135 may be configured as or otherwise support a means for communicating with the base station during the first subset of symbols in accordance with the first guard interval format.

Figure 12:
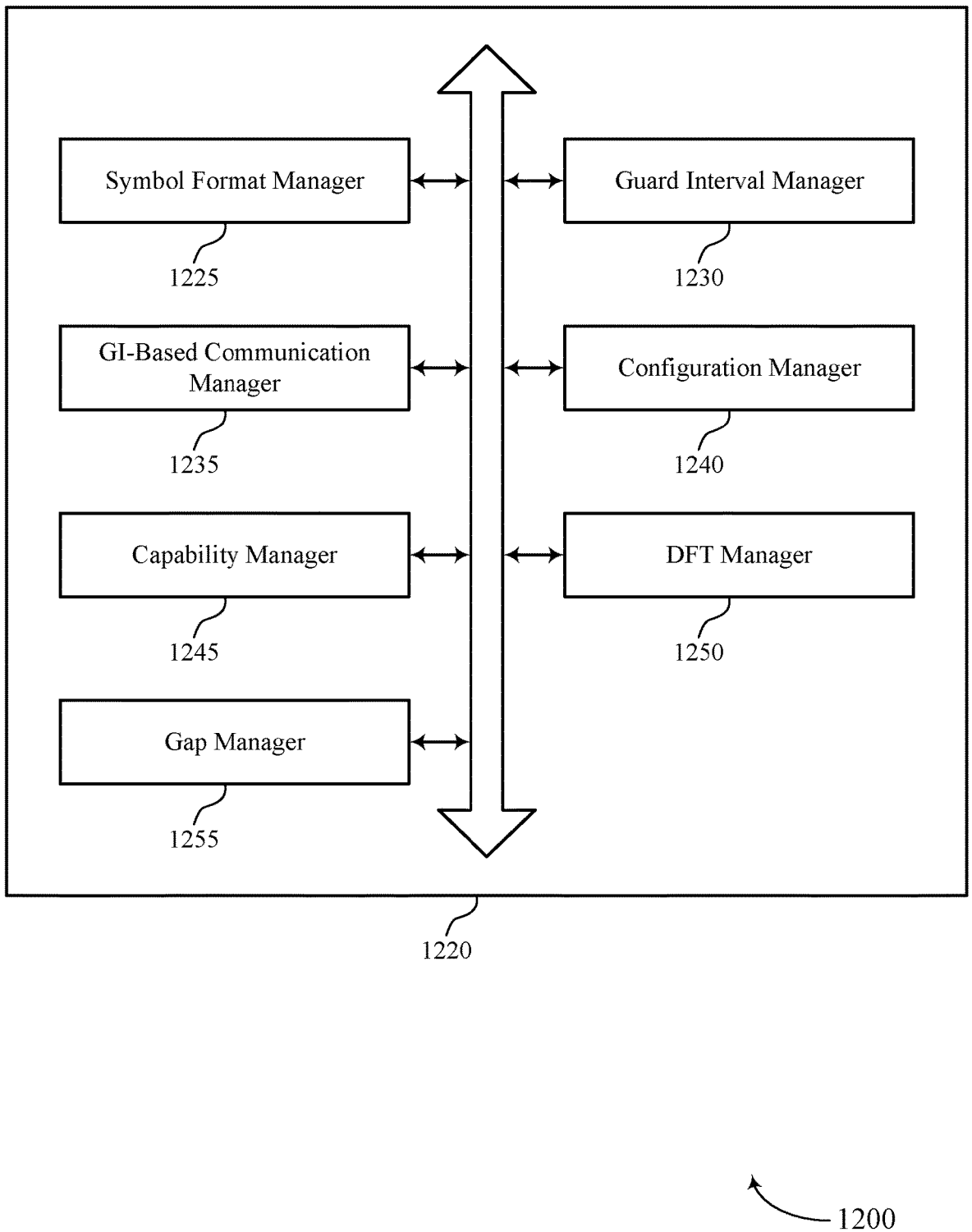
FIG. 12 shows a block diagram of a communications manager that supports techniques for signaling symbol format for guard interval based waveforms in accordance with aspects of the present disclosure.

FIG. 12 shows a block diagram 1200 of a communications manager 1220 that supports techniques for signaling symbol format for guard interval based waveforms in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of techniques for signaling symbol format for guard interval based waveforms as described herein. For example, the communications manager 1220 may include a symbol format manager 1225, a guard interval manager 1230, a GI-based communication manager 1235, a configuration manager 1240, a capability manager 1245, a DFT manager 1250, a gap manager 1255, or any combination thereof. Each of these components may communicate, directly or indirectly, with one another (e.g., via one or more buses).

The communications manager 1220 may support wireless communication at a UE in accordance with examples as disclosed herein. The symbol format manager 1225 may be configured as or otherwise support a means for receiving, from a base station, control information indicating a symbol structure for a set of symbols, the symbol structure including a symbol format of a set of multiple symbol formats for one or more subsets of the set of symbols. The guard interval manager 1230 may be configured as or otherwise support a means for identifying, based on the symbol format of the set of multiple symbol formats, a first guard interval format of a first subset of the set of symbols. The GI-based communication manager 1235 may be configured as or otherwise support a means for communicating with the base station during the first subset of symbols in accordance with the first guard interval format.

In some examples, the symbol format manager 1225 may be configured as or otherwise support a means for determining, based on the symbol format of the set of multiple symbol formats, that at least a second subset of symbols has a second symbol format of the set of multiple different available symbol formats that is different than the first guard interval format. In some examples, the GI-based communication manager 1235 may be configured as or otherwise support a means for communicating with the base station during at least the second subset of symbols in accordance with the second symbol format.

In some examples, the control information indicates one or more of a guard interval length, guard interval type, a receiver DFT window placement relative to a symbol boundary, a receiver DFT window size, an indication of one or more gaps within one or more symbols, or any combinations thereof, for at least the first subset of symbols. In some examples, the guard interval type indicates a header guard interval in which a guard interval precedes data within a symbol, a tail guard interval in which data precedes a guard interval within the symbol, or that no guard interval is present in the symbol. In some examples, the guard interval type further indicates a zero tail or unique word guard interval, a guard interval generation technique, or any combinations thereof. In some examples, the receiver DFT window placement indicates a normal, a delayed, or an advanced receiver DFT window relative to a time domain symbol boundary. In some examples, the receiver DFT window size indicates a DFT duration as a DFT window size value or as an indication of a selected DFT window size from a set of available DFT window sizes.

In some examples, the indication of one or more gaps within one or more symbols indicates a presence or absence of a gap associated with a guard interval within a symbol, a location of the guard interval within the symbol, or any combinations thereof. In some examples, the indication of one or more gaps within one or more symbols indicates a presence or absence of a gap associated with a guard interval within a symbol, a location of the guard interval within the symbol, or any combinations thereof.

In some examples, to support receiving, the configuration manager 1240 may be configured as or otherwise support a means for receiving the control information in one or more of RRC signaling, a MAC-CE, DCI, or any combinations thereof. In some examples, the control information includes a symbol format indicator for each of the one or more subsets of the set of symbols, and where the symbol format indicator is transmitted in DCI or a MAC-CE associated with the set of symbols, or the symbol format indicator is configured via RRC signaling and a subsequent indicator provided in DCI or a MAC-CE can indicate a temporary change in the symbol structure.

In some examples, the control information is provided for one or more UEs, one or more beams, one or more sub-bands, one or more UE antenna panels, one or more channels, or any combinations thereof. In some examples, the control information indicates the symbol format for each symbol of the set of symbols, or indicates a mapping between symbol formats of the one or more subsets of the set of symbols and one or more transmission parameters. In some examples, the symbol structure is applied across all symbols after the receiving the control information, is applied according to a pattern of sets of symbols, is applied for a configured time period, is applied for one or more slots or sub-slots, or any combinations thereof.

In some examples, the capability manager 1245 may be configured as or otherwise support a means for transmitting a UE capability report to the base station, where the control information indicating the symbol structure is received based on the UE capability report. In some examples, the GI-based communication manager 1235 may be configured as or otherwise support a means for applying the symbol structure for the set of symbols that start at a time period after receiving the control information, where the time period is indicated by the control information, is based on a UE capability, or any combinations thereof.

Figure 13:
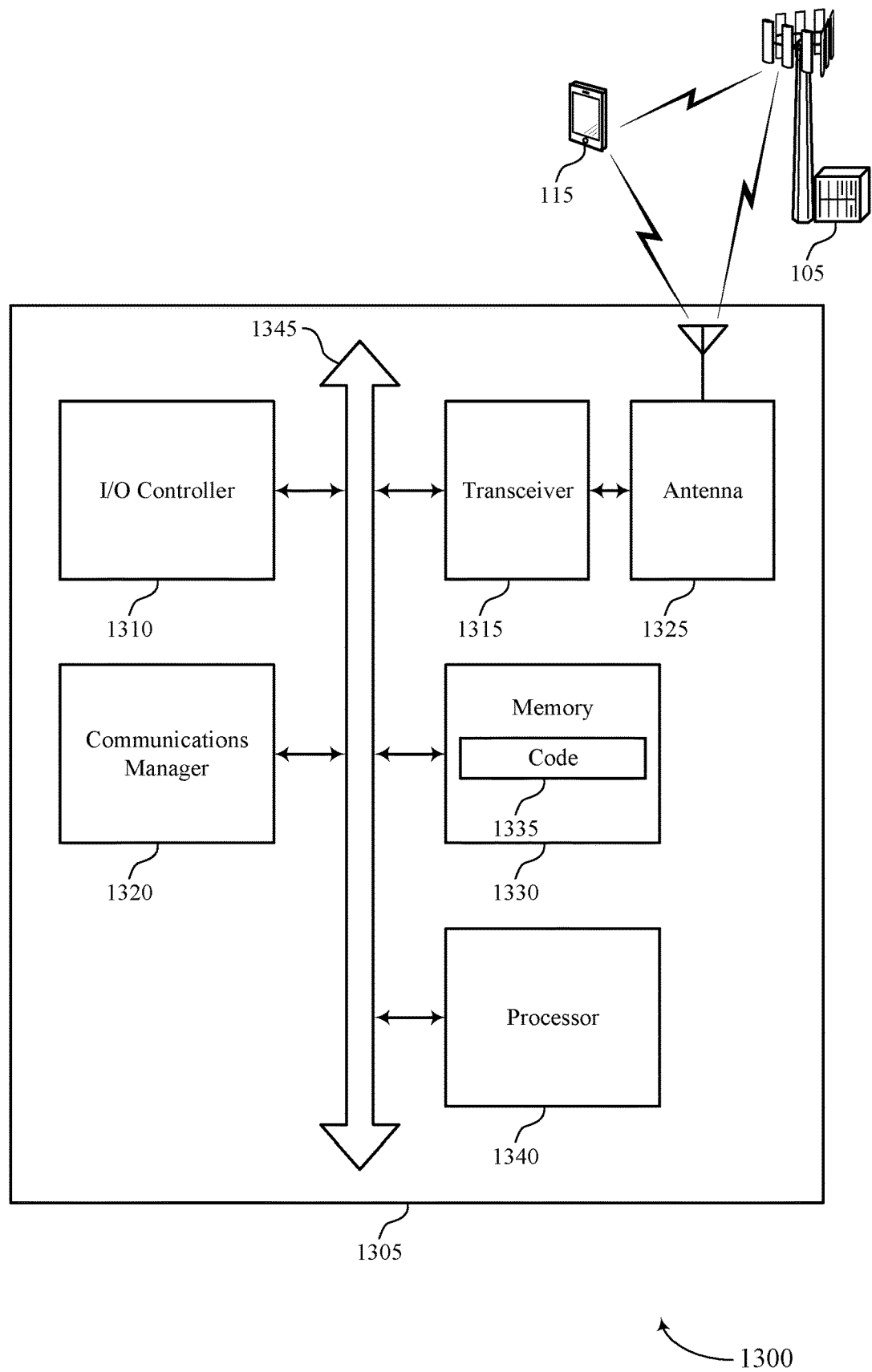
FIG. 13 shows a diagram of a system including a device that supports techniques for signaling symbol format for guard interval based waveforms in accordance with aspects of the present disclosure.

FIG. 13 shows a diagram of a system 1300 including a device 1305 that supports techniques for signaling symbol format for guard interval based waveforms in accordance with aspects of the present disclosure. The device 1305 may be an example of or include the components of a device 1005, a device 1105, or a UE 115 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, an input/output (I/O) controller 1310, a transceiver 1315, an antenna 1325, a memory 1330, code 1335, and a processor 1340. These components may be in electronic communication or otherwise coupled (e.g., operatively, communicatively, functionally, electronically, electrically) via one or more buses (e.g., a bus 1345).

The I/O controller 1310 may manage input and output signals for the device 1305. The I/O controller 1310 may also manage peripherals not integrated into the device 1305. In some cases, the I/O controller 1310 may represent a physical connection or port to an external peripheral. In some cases, the I/O controller 1310 may utilize an operating system such as iOS®, ANDROID®, MS-DOS®, MS-WIN- DOWS®, OS/2®, UNIX®, LINUX®, or another known operating system. Additionally or alternatively, the I/O controller 1310 may represent or interact with a modem, a keyboard, a mouse, a touchscreen, or a similar device. In some cases, the I/O controller 1310 may be implemented as part of a processor, such as the processor 1340. In some cases, a user may interact with the device 1305 via the I/O controller 1310 or via hardware components controlled by the I/O controller 1310.

In some cases, the device 1305 may include a single antenna 1325. However, in some other cases, the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include random access memory (RAM) and read-only memory (ROM). The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a basic I/O system (BIOS) which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting techniques for signaling symbol format for guard interval based waveforms). For example, the device 1305 or a component of the device 1305 may include a processor 1340 and memory 1330 coupled to the processor 1340, the processor 1340 and memory 1330 configured to perform various functions described herein.

The communications manager 1320 may support wireless communication at a UE in accordance with examples as disclosed herein. For example, the communications manager 1320 may be configured as or otherwise support a means for receiving, from a base station, control information indicating a symbol structure for a set of symbols, the symbol structure including a symbol format of a set of multiple symbol formats for one or more subsets of the set of symbols. The communications manager 1320 may be configured as or otherwise support a means for identifying, based on the symbol format of the set of multiple symbol formats, a first guard interval format of a first subset of the set of symbols. The communications manager 1320 may be configured as or otherwise support a means for communicating with the base station during the first subset of symbols in accordance with the first guard interval format.

By including or configuring the communications manager 1320 in accordance with examples as described herein, the device 1305 may support techniques for reduced processing overhead, reduced power consumption, and more efficient utilization of communication resources. By receiving control information indicating a symbol structure, the device 1305 may support symbol structures for different subsets of symbols that have different GI configurations, different CP formats, different symbol durations, different DFT window sizes, or any combinations thereof. Such techniques may provide for reduced latency and reduced processing by the processor of the device 1005, more efficient utilization of communication resources, and enhanced reliability for communications.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of techniques for signaling symbol format for guard interval based waveforms as described herein, or the processor 1340 and the memory 1330 may be otherwise configured to perform or support such operations.

Figure 14:
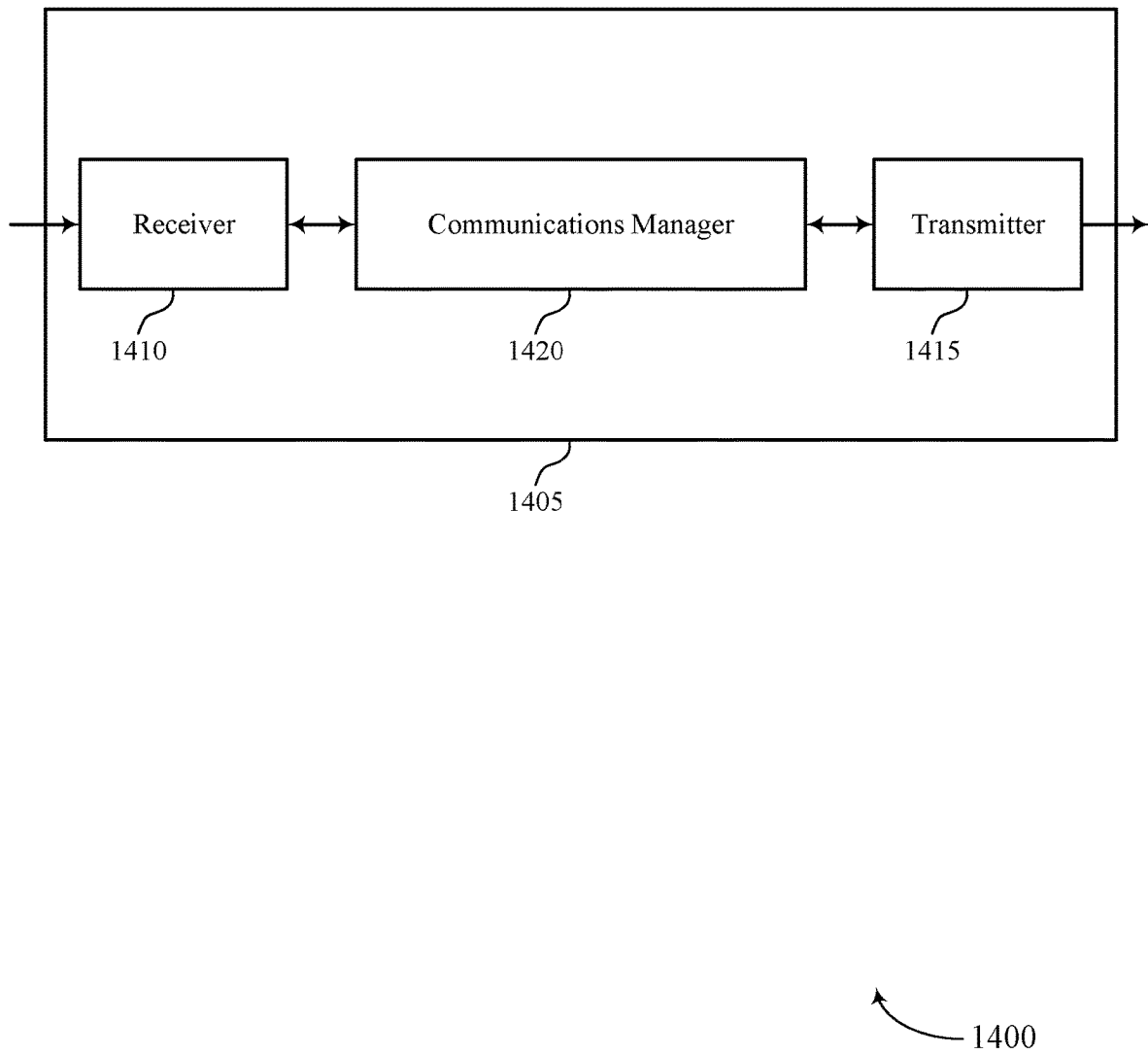
FIGS. 14 and 15 show block diagrams of devices that support techniques for signaling symbol format for guard interval based waveforms in accordance with aspects of the present disclosure.

FIG. 14 shows a block diagram 1400 of a device 1405 that supports techniques for signaling symbol format for guard interval based waveforms in accordance with aspects of the present disclosure. The device 1405 may be an example of aspects of a base station 105 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for receiving information such as packets, user data, control information, or any combination thereof associated with various information channels (e.g., control channels, data channels, information channels related to techniques for signaling symbol format for guard interval based waveforms). Information may be passed on to other components of the device 1405. The receiver 1410 may utilize a single antenna or a set of multiple antennas.

The transmitter 1415 may provide a means for transmitting signals generated by other components of the device 1405. For example, the transmitter 1415 may transmit information such as packets, user data, control information, or any combination thereof associated with various information channels (e.g., control channels, data channels, information channels related to techniques for signaling symbol format for guard interval based waveforms). In some examples, the transmitter 1415 may be co-located with a receiver 1410 in a transceiver module. The transmitter 1415 may utilize a single antenna or a set of multiple antennas.

The communications manager 1420, the receiver 1410, the transmitter 1415, or various combinations thereof or various components thereof may be examples of means for performing various aspects of techniques for signaling symbol format for guard interval based waveforms as described herein. For example, the communications manager 1420, the receiver 1410, the transmitter 1415, or various combinations or components thereof may support a method for performing one or more of the functions described herein.

In some examples, the communications manager 1420, the receiver 1410, the transmitter 1415, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1420, the receiver 1410, the transmitter 1415, or various combinations or components thereof may be implemented in code (e.g., as communications management software or firmware) executed by a processor. If implemented in code executed by a processor, the functions of the communications manager 1420, the receiver 1410, the transmitter 1415, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1420 may be configured to perform various operations (e.g., receiving, monitoring, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to receive information, transmit information, or perform various other operations as described herein.

The communications manager 1420 may support wireless communication at a base station in accordance with examples as disclosed herein. For example, the communications manager 1420 may be configured as or otherwise support a means for transmitting, to a UE, control information that indicates a symbol structure for a set of symbols, the symbol structure indicating a symbol format of a set of multiple symbol formats for one or more subsets of the set of symbols. The communications manager 1420 may be configured as or otherwise support a means for identifying, based on the symbol format of the set of multiple symbol formats, a first guard interval format of a first subset of the set of symbols. The communications manager 1420 may be configured as or otherwise support a means for communicating with the UE during at least the first subset of symbols in accordance with the first guard interval format.

By including or configuring the communications manager 1420 in accordance with examples as described herein, the device 1405 (e.g., a processor controlling or otherwise coupled to the receiver 1410, the transmitter 1415, the communications manager 1420, or a combination thereof) may support techniques for reduced processing overhead, reduced power consumption, and more efficient utilization of communication resources. By receiving control information indicating a symbol structure, the device 1005 may support symbol structures for different subsets of symbols that have different GI configurations, different CP formats, different symbol durations, different DFT window sizes, or any combinations thereof. Such techniques may provide for reduced latency and reduced processing by the processor of the device 1405, more efficient utilization of communication resources, and enhanced reliability for communications.

Figure 15:
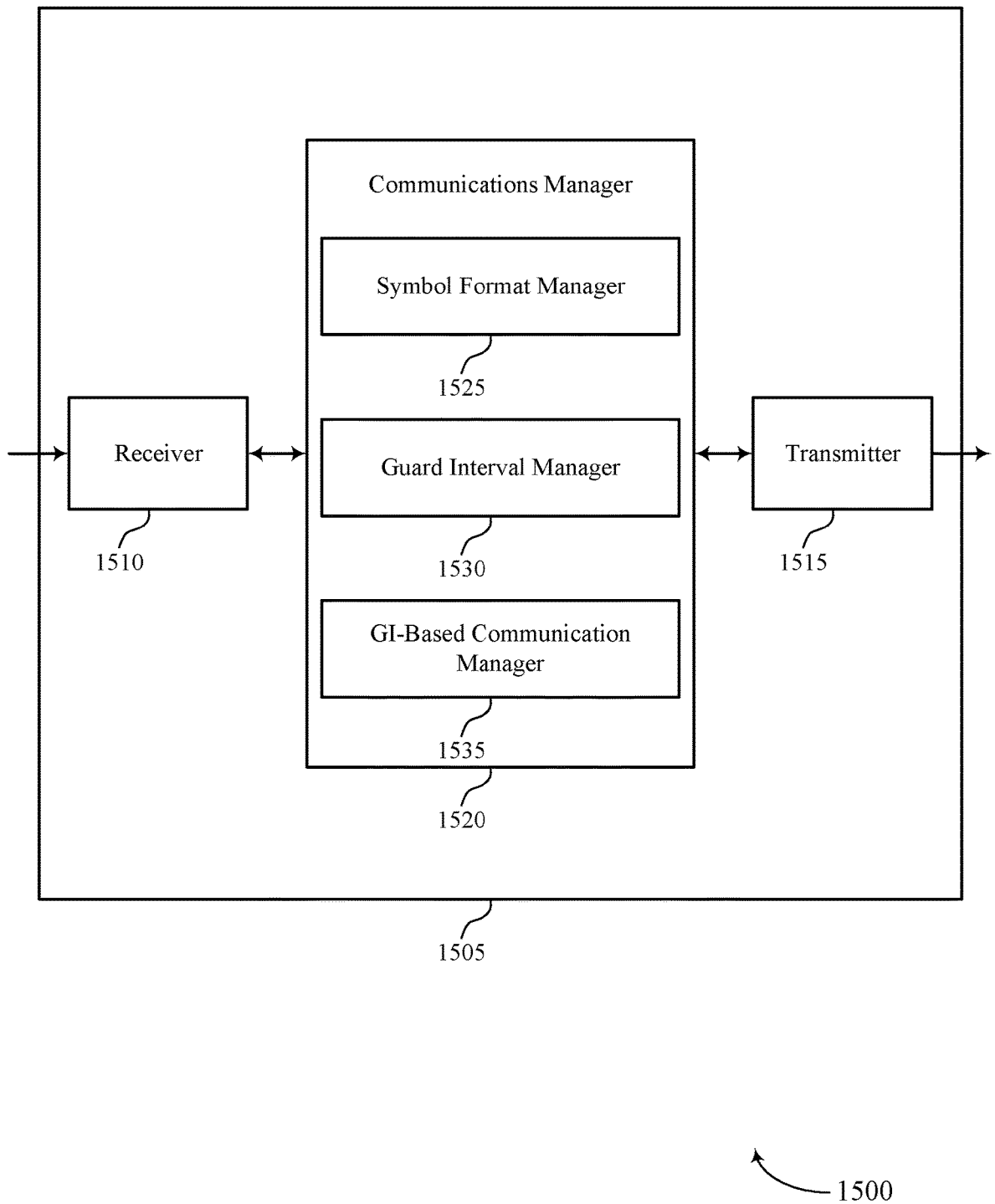

FIG. 15 shows a block diagram 1500 of a device 1505 that supports techniques for signaling symbol format for guard interval based waveforms in accordance with aspects of the present disclosure. The device 1505 may be an example of aspects of a device 1405 or a base station 105 as described herein. The device 1505 may include a receiver 1510, a transmitter 1515, and a communications manager 1520. The device 1505 may also include a processor. Each of these components may be in communication with one another (e.g., via one or more buses).

The receiver 1510 may provide a means for receiving information such as packets, user data, control information, or any combination thereof associated with various information channels (e.g., control channels, data channels, information channels related to techniques for signaling symbol format for guard interval based waveforms). Information may be passed on to other components of the device 1505. The receiver 1510 may utilize a single antenna or a set of multiple antennas.

The transmitter 1515 may provide a means for transmitting signals generated by other components of the device 1505. For example, the transmitter 1515 may transmit information such as packets, user data, control information, or any combination thereof associated with various information channels (e.g., control channels, data channels, information channels related to techniques for signaling symbol format for guard interval based waveforms). In some examples, the transmitter 1515 may be co-located with a receiver 1510 in a transceiver module. The transmitter 1515 may utilize a single antenna or a set of multiple antennas.

The device 1505, or various components thereof, may be an example of means for performing various aspects of techniques for signaling symbol format for guard interval based waveforms as described herein. For example, the communications manager 1520 may include a symbol format manager 1525, a guard interval manager 1530, a GI-based communication manager 1535, or any combination thereof. The communications manager 1520 may be an example of aspects of a communications manager 1420 as described herein. In some examples, the communications manager 1520, or various components thereof, may be configured to perform various operations (e.g., receiving, monitoring, transmitting) using or otherwise in cooperation with the receiver 1510, the transmitter 1515, or both. For example, the communications manager 1520 may receive information from the receiver 1510, send information to the transmitter 1515, or be integrated in combination with the receiver 1510, the transmitter 1515, or both to receive information, transmit information, or perform various other operations as described herein.

The communications manager 1520 may support wireless communication at a base station in accordance with examples as disclosed herein. The symbol format manager 1525 may be configured as or otherwise support a means for transmitting, to a UE, control information that indicates a symbol structure for a set of symbols, the symbol structure indicating a symbol format of a set of multiple symbol formats for one or more subsets of the set of symbols. The guard interval manager 1530 may be configured as or otherwise support a means for identifying, based on the symbol format of the set of multiple symbol formats, a first guard interval format of a first subset of the set of symbols. The GI-based communication manager 1535 may be configured as or otherwise support a means for communicating with the UE during at least the first subset of symbols in accordance with the first guard interval format.

Figure 16:
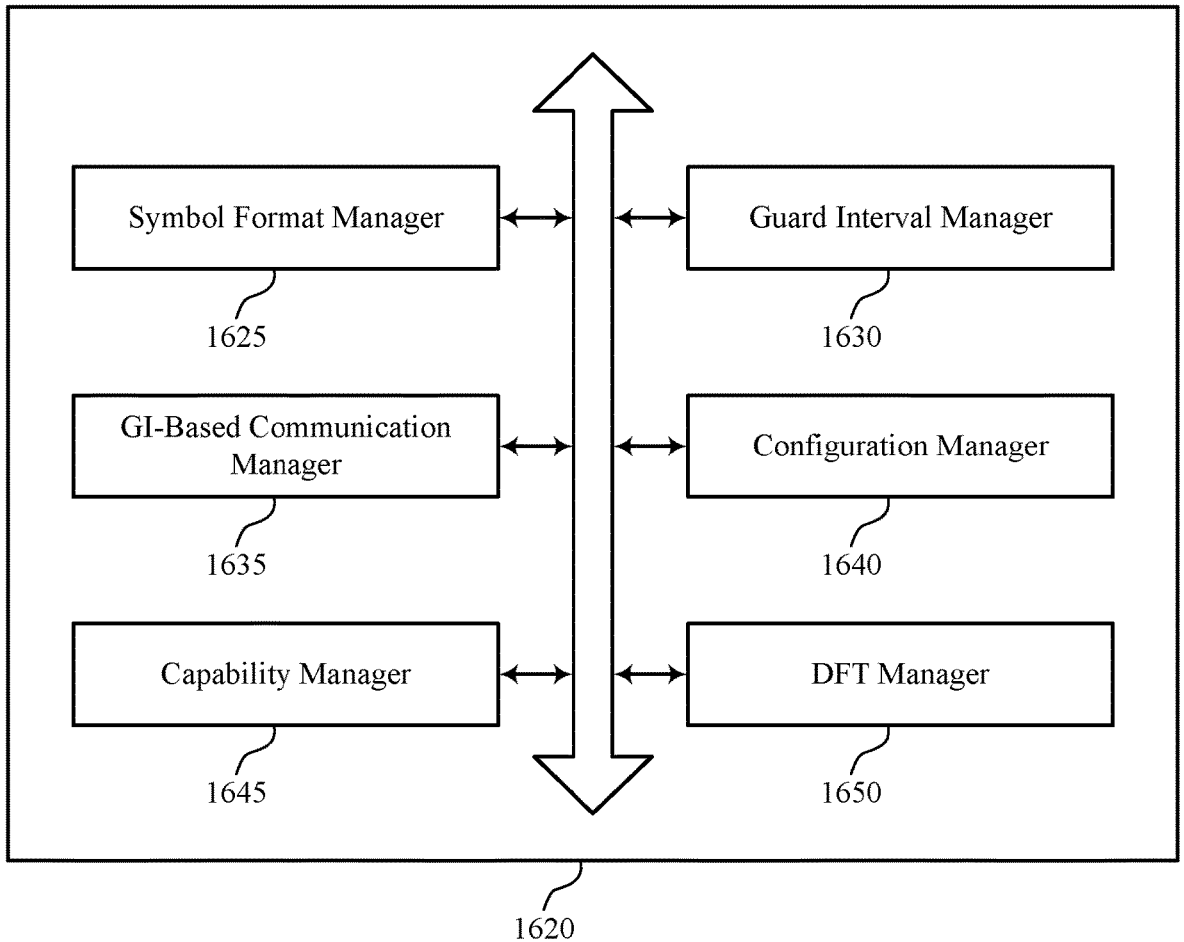
FIG. 16 shows a block diagram of a communications manager that supports techniques for signaling symbol format for guard interval based waveforms in accordance with aspects of the present disclosure.

FIG. 16 shows a block diagram 1600 of a communications manager 1620 that supports techniques for signaling symbol format for guard interval based waveforms in accordance with aspects of the present disclosure. The communications manager 1620 may be an example of aspects of a communications manager 1420, a communications manager 1520, or both, as described herein. The communications manager 1620, or various components thereof, may be an example of means for performing various aspects of techniques for signaling symbol format for guard interval based waveforms as described herein. For example, the communications manager 1620 may include a symbol format manager 1625, a guard interval manager 1630, a GI-based communication manager 1635, a configuration manager 1640, a capability manager 1645, a DFT manager 1650, or any combination thereof. Each of these components may communicate, directly or indirectly, with one another (e.g., via one or more buses).

The communications manager 1620 may support wireless communication at a base station in accordance with examples as disclosed herein. The symbol format manager 1625 may be configured as or otherwise support a means for transmitting, to a UE, control information that indicates a symbol structure for a set of symbols, the symbol structure indicating a symbol format of a set of multiple symbol formats for one or more subsets of the set of symbols. The guard interval manager 1630 may be configured as or otherwise support a means for identifying, based on the symbol format of the set of multiple symbol formats, a first guard interval format of a first subset of the set of symbols. The GI-based communication manager 1635 may be configured as or otherwise support a means for communicating with the UE during at least the first subset of symbols in accordance with the first guard interval format.

In some examples, the control information indicates one or more of a guard interval length, guard interval type, a receiver DFT window placement relative to a symbol boundary, a receiver DFT window size, an indication of one or more gaps within one or more symbols, or any combinations thereof, for at least the first subset of symbols. In some examples, the guard interval type indicates a header guard interval in which a guard interval precedes data within a symbol, a tail guard interval in which data precedes the guard interval within the symbol, or that no guard interval is present in the symbol. In some examples, the receiver DFT window placement indicates a normal, a delayed, or an advanced receiver DFT window relative to a time domain symbol boundary, and the receiver DFT window size indicates a DFT duration as a DFT window size value or as an indication of a selected DFT window size from a set of available DFT window sizes.

In some examples, to support transmitting, the configuration manager 1640 may be configured as or otherwise support a means for transmitting the control information in one or more of RRC signaling, a MAC-CE control element, DCI, or any combinations thereof.

In some examples, the symbol format manager 1625 may be configured as or otherwise support a means for determining, based on the symbol format of the set of multiple symbol formats, that at least a second subset of symbols of the set of symbols has a second symbol format that is different than the first guard interval format. In some examples, the GI-based communication manager 1635 may be configured as or otherwise support a means for communicating with the UE during at least the second subset of symbols in accordance with the second symbol format.

In some examples, the control information includes a symbol format indicator for each of the one or more subsets of the set of symbols, and where the symbol format indicator is transmitted in DCI or a MAC-CE associated with the set of symbols, or the symbol format indicator is configured via RRC signaling and a subsequent indicator provided in DCI or a MAC-CE can indicate a temporary change in the symbol structure.

In some examples, the capability manager 1645 may be configured as or otherwise support a means for receiving a UE capability report from the UE, where the control information indicating the symbol structure is transmitted based on the UE capability report.

Figure 17:
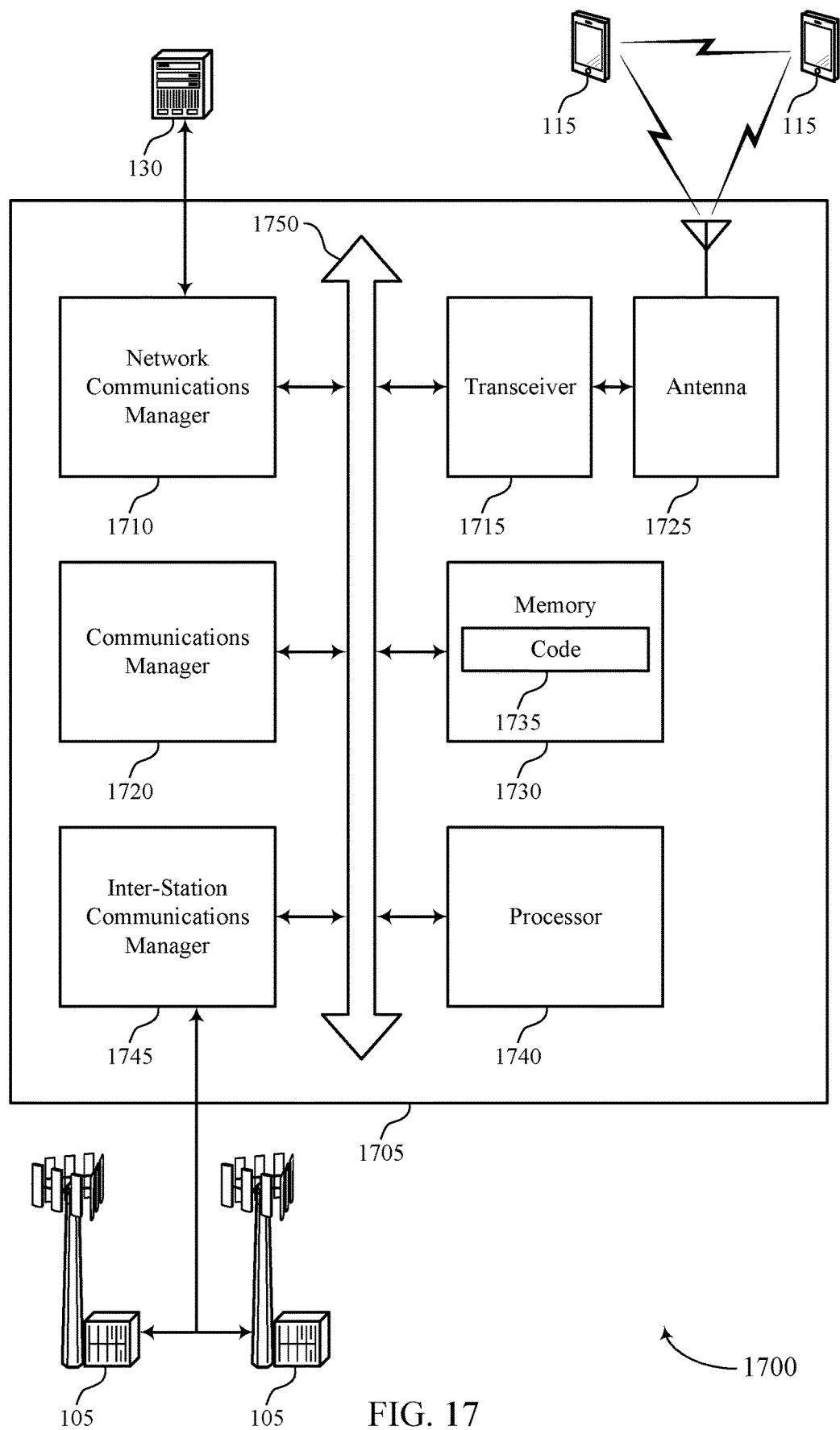
FIG. 17 shows a diagram of a system including a device that supports techniques for signaling symbol format for guard interval based waveforms in accordance with aspects of the present disclosure.

FIG. 17 shows a diagram of a system 1700 including a device 1705 that supports techniques for signaling symbol format for guard interval based waveforms in accordance with aspects of the present disclosure. The device 1705 may be an example of or include the components of a device 1405, a device 1505, or a base station 105 as described herein. The device 1705 may communicate wirelessly with one or more base stations 105, UEs 115, or any combination thereof. The device 1705 may include components for bi-directional voice and data communications including components for transmitting and receiving communications, such as a communications manager 1720, a network communications manager 1710, a transceiver 1715, an antenna 1725, a memory 1730, code 1735, a processor 1740, and an inter-station communications manager 1745. These components may be in electronic communication or otherwise coupled (e.g., operatively, communicatively, functionally, electronically, electrically) via one or more buses (e.g., a bus 1750).

The network communications manager 1710 may manage communications with a core network 130 (e.g., via one or more wired backhaul links). For example, the network communications manager 1710 may manage the transfer of data communications for client devices, such as one or more UEs 115.

In some cases, the device 1705 may include a single antenna 1725. However, in some other cases the device 1705 may have more than one antenna 1725, which may be capable of concurrently transmitting or receiving multiple wireless transmissions. The transceiver 1715 may communicate bi-directionally, via the one or more antennas 1725, wired, or wireless links as described herein. For example, the transceiver 1715 may represent a wireless transceiver and may communicate bi-directionally with another wireless transceiver. The transceiver 1715 may also include a modem to modulate the packets, to provide the modulated packets to one or more antennas 1725 for transmission, and to demodulate packets received from the one or more antennas 1725. The transceiver 1715, or the transceiver 1715 and one or more antennas 1725, may be an example of a transmitter 1415, a transmitter 1515, a receiver 1410, a receiver 1510, or any combination thereof or component thereof, as described herein.

The memory 1730 may include RAM and ROM. The memory 1730 may store computer-readable, computer-executable code 1735 including instructions that, when executed by the processor 1740, cause the device 1705 to perform various functions described herein. The code 1735 may be stored in a non-transitory computer-readable medium such as system memory or another type of memory. In some cases, the code 1735 may not be directly executable by the processor 1740 but may cause a computer (e.g., when compiled and executed) to perform functions described herein. In some cases, the memory 1730 may contain, among other things, a BIOS which may control basic hardware or software operation such as the interaction with peripheral components or devices.

The processor 1740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1740 may be configured to operate a memory array using a memory controller. In some other cases, a memory controller may be integrated into the processor 1740. The processor 1740 may be configured to execute computer-readable instructions stored in a memory (e.g., the memory 1730) to cause the device 1705 to perform various functions (e.g., functions or tasks supporting techniques for signaling symbol format for guard interval based waveforms). For example, the device 1705 or a component of the device 1705 may include a processor 1740 and memory 1730 coupled to the processor 1740, the processor 1740 and memory 1730 configured to perform various functions described herein.

The inter-station communications manager 1745 may manage communications with other base stations 105, and may include a controller or scheduler for controlling communications with UEs 115 in cooperation with other base stations 105. For example, the inter-station communications manager 1745 may coordinate scheduling for transmissions to UEs 115 for various interference mitigation techniques such as beamforming or joint transmission. In some examples, the inter-station communications manager 1745 may provide an X2 interface within an LTE/LTE-A wireless communications network technology to provide communication between base stations 105.

The communications manager 1720 may support wireless communication at a base station in accordance with examples as disclosed herein. For example, the communications manager 1720 may be configured as or otherwise support a means for transmitting, to a UE, control information that indicates a symbol structure for a set of symbols, the symbol structure indicating a symbol format of a set of multiple symbol formats for one or more subsets of the set of symbols. The communications manager 1720 may be configured as or otherwise support a means for identifying, based on the symbol format of the set of multiple symbol formats, a first guard interval format of a first subset of the set of symbols. The communications manager 1720 may be configured as or otherwise support a means for communicating with the UE during at least the first subset of symbols in accordance with the first guard interval format.

By including or configuring the communications manager 1720 in accordance with examples as described herein, the device 1705 may support techniques for reduced processing overhead, reduced power consumption, and more efficient utilization of communication resources. By receiving control information indicating a symbol structure, the device 1005 may support symbol structures for different subsets of symbols that have different GI configurations, different CP formats, different symbol durations, different DFT window sizes, or any combinations thereof. Such techniques may provide for reduced latency and reduced processing by the processor of the device 1705, more efficient utilization of communication resources, and enhanced reliability for communications.

In some examples, the communications manager 1720 may be configured to perform various operations (e.g., receiving, monitoring, transmitting) using or otherwise in cooperation with the transceiver 1715, the one or more antennas 1725, or any combination thereof. Although the communications manager 1720 is illustrated as a separate component, in some examples, one or more functions described with reference to the communications manager 1720 may be supported by or performed by the processor 1740, the memory 1730, the code 1735, or any combination thereof. For example, the code 1735 may include instructions executable by the processor 1740 to cause the device 1705 to perform various aspects of techniques for signaling symbol format for guard interval based waveforms as described herein, or the processor 1740 and the memory 1730 may be otherwise configured to perform or support such operations.

Figure 18:
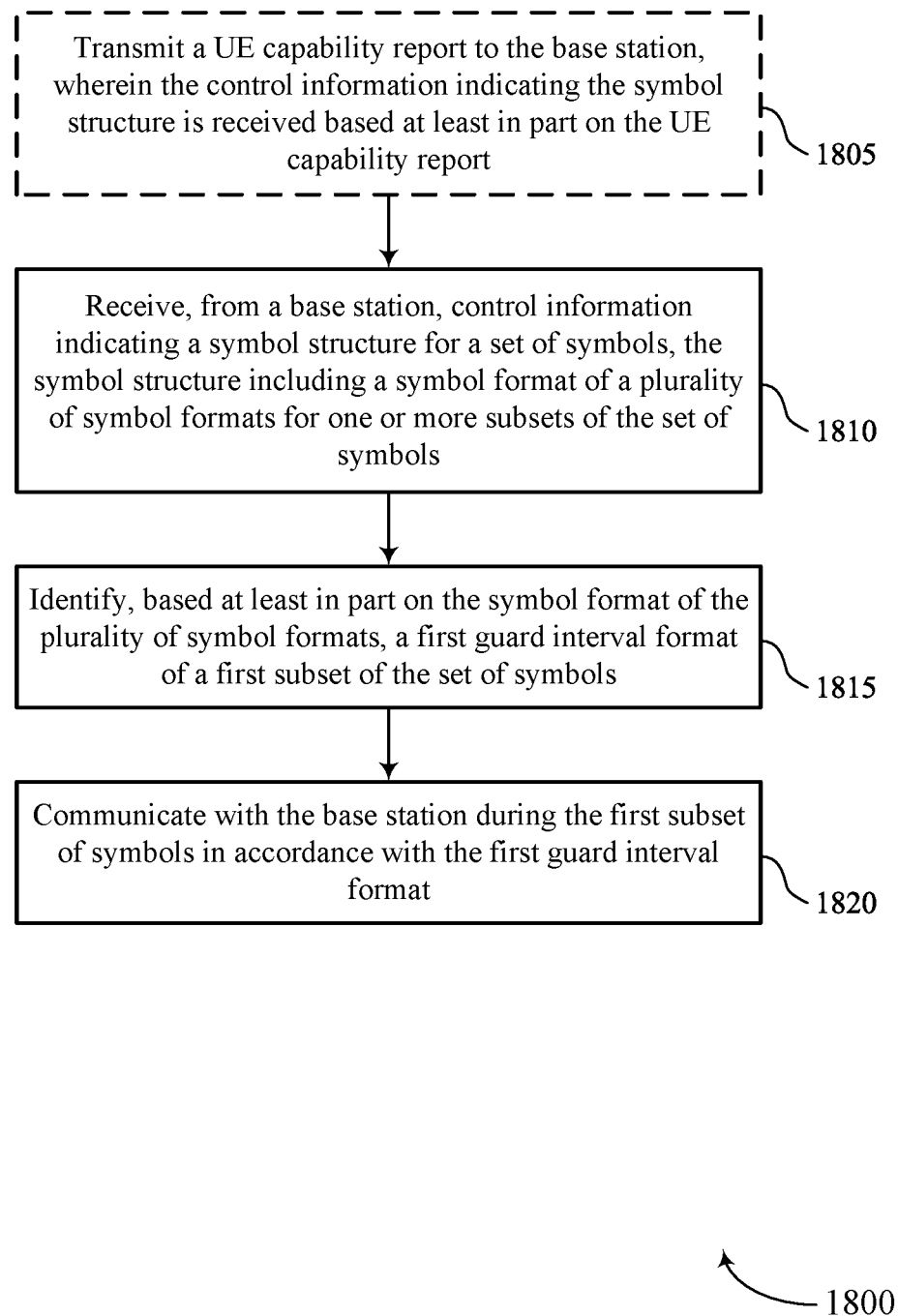
FIGS. 18 through 24 show flowcharts illustrating methods that support techniques for signaling symbol format for guard interval based waveforms in accordance with aspects of the present disclosure.

FIG. 18 shows a flowchart illustrating a method 1800 that supports techniques for signaling symbol format for guard interval based waveforms in accordance with aspects of the present disclosure. The operations of the method 1800 may be implemented by a UE or its components as described herein. For example, the operations of the method 1800 may be performed by a UE 115 as described with reference to FIGS. 1 through 13. In some examples, a UE may execute a set of instructions to control the functional elements of the UE to perform the described functions. Additionally or alternatively, the UE may perform aspects of the described functions using special-purpose hardware.

Optionally, at 1805, the method may include transmitting a UE capability report to the base station, where the control information indicating the symbol structure is received based on the UE capability report. The operations of 1805 may be performed in accordance with examples as disclosed herein. In some examples, aspects of the operations of 1805 may be performed by a capability manager 1245 as described with reference to FIG. 12.

At 1810, the method may include receiving, from a base station, control information indicating a symbol structure for a set of symbols, the symbol structure including a symbol format of a set of multiple symbol formats for one or more subsets of the set of symbols. The operations of 1810 may be performed in accordance with examples as disclosed herein. In some examples, aspects of the operations of 1810 may be performed by a symbol format manager 1225 as described with reference to FIG. 12.

At 1815, the method may include identifying, based on the symbol format of the set of multiple symbol formats, a first guard interval format of a first subset of the set of symbols. The operations of 1815 may be performed in accordance with examples as disclosed herein. In some examples, aspects of the operations of 1815 may be performed by a guard interval manager 1230 as described with reference to FIG. 12.

At 1820, the method may include communicating with the base station during the first subset of symbols in accordance with the first guard interval format. The operations of 1820 may be performed in accordance with examples as disclosed herein. In some examples, aspects of the operations of 1820 may be performed by a GI-based communication manager 1235 as described with reference to FIG. 12.

Figure 19:
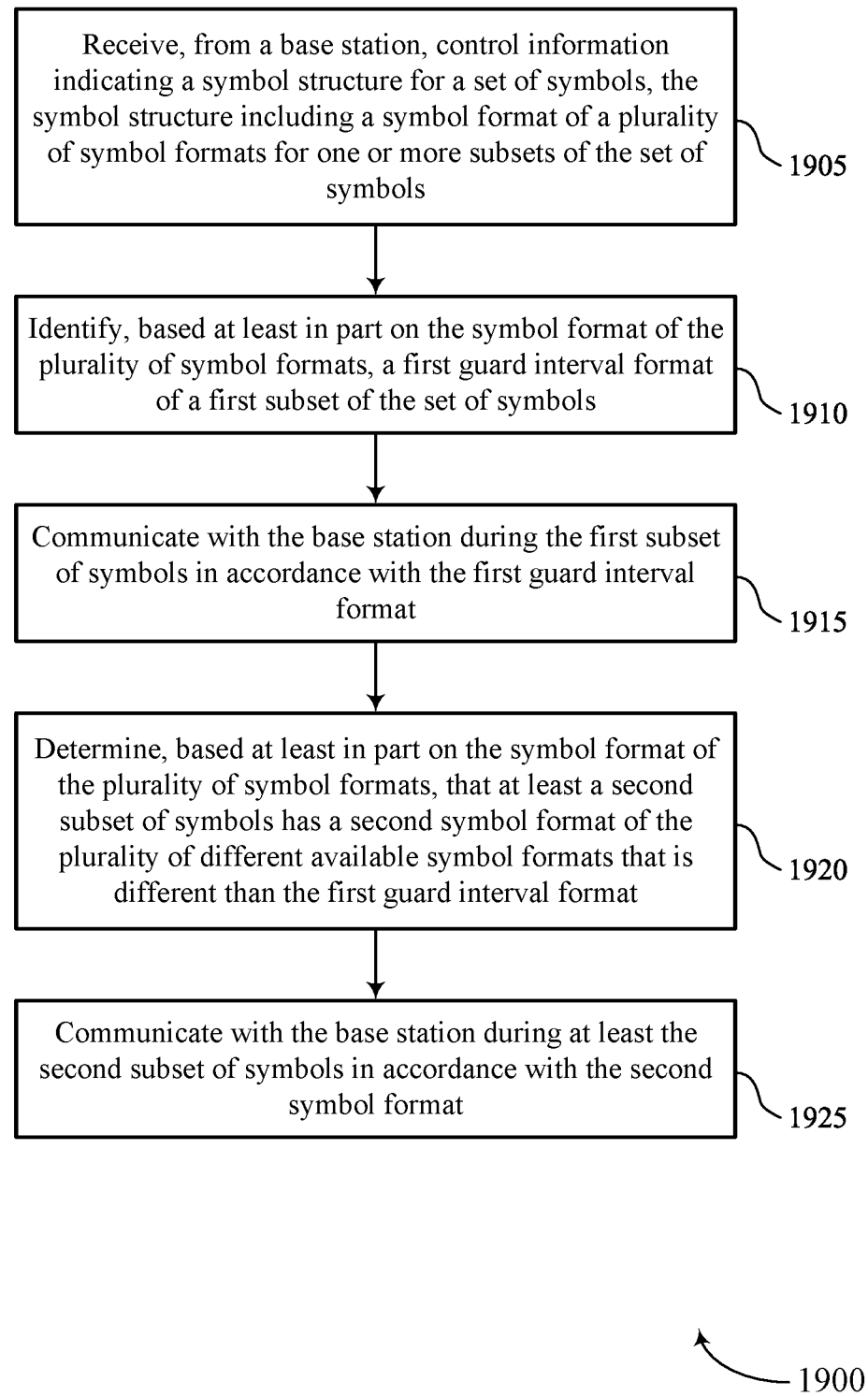

FIG. 19 shows a flowchart illustrating a method 1900 that supports techniques for signaling symbol format for guard interval based waveforms in accordance with aspects of the present disclosure. The operations of the method 1900 may be implemented by a UE or its components as described herein. For example, the operations of the method 1900 may be performed by a UE 115 as described with reference to FIGS. 1 through 13. In some examples, a UE may execute a set of instructions to control the functional elements of the UE to perform the described functions. Additionally or alternatively, the UE may perform aspects of the described functions using special-purpose hardware.

At 1905, the method may include receiving, from a base station, control information indicating a symbol structure for a set of symbols, the symbol structure including a symbol format of a set of multiple symbol formats for one or more subsets of the set of symbols. The operations of 1905 may be performed in accordance with examples as disclosed herein. In some examples, aspects of the operations of 1905 may be performed by a symbol format manager 1225 as described with reference to FIG. 12.

At 1910, the method may include identifying, based on the symbol format of the set of multiple symbol formats, a first guard interval format of a first subset of the set of symbols. The operations of 1910 may be performed in accordance with examples as disclosed herein. In some examples, aspects of the operations of 1910 may be performed by a guard interval manager 1230 as described with reference to FIG. 12.

At 1915, the method may include communicating with the base station during the first subset of symbols in accordance with the first guard interval format. The operations of 1915 may be performed in accordance with examples as disclosed herein. In some examples, aspects of the operations of 1915 may be performed by a GI-based communication manager 1235 as described with reference to FIG. 12.

At 1920, the method may include determining, based on the symbol format of the set of multiple symbol formats, that at least a second subset of symbols has a second symbol format of the set of multiple different available symbol formats that is different than the first guard interval format. The operations of 1920 may be performed in accordance with examples as disclosed herein. In some examples, aspects of the operations of 1920 may be performed by a symbol format manager 1225 as described with reference to FIG. 12.

At 1925, the method may include communicating with the base station during at least the second subset of symbols in accordance with the second symbol format. The operations of 1925 may be performed in accordance with examples as disclosed herein. In some examples, aspects of the operations of 1925 may be performed by a GI-based communication manager 1235 as described with reference to FIG. 12.

Figure 20:
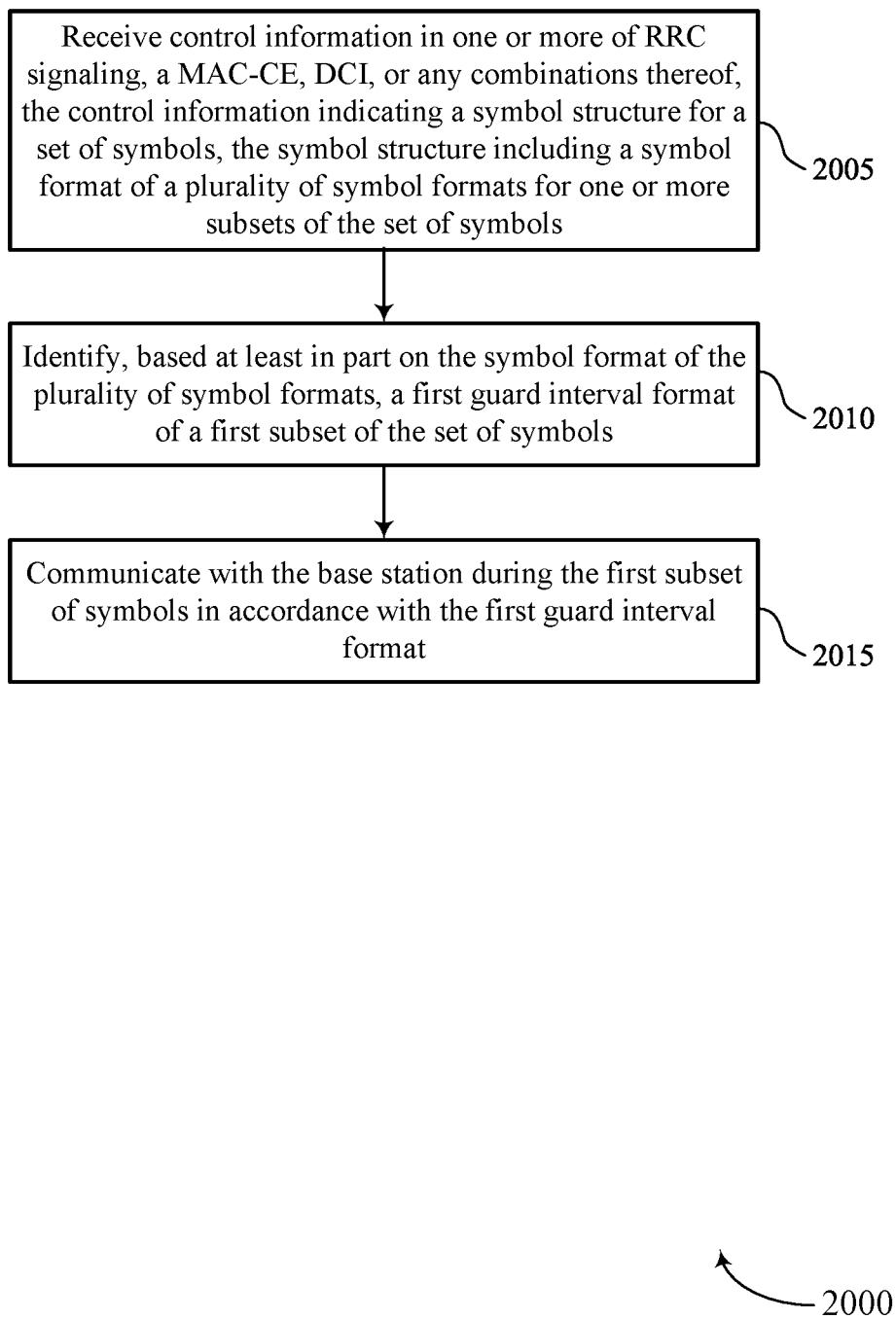

FIG. 20 shows a flowchart illustrating a method 2000 that supports techniques for signaling symbol format for guard interval based waveforms in accordance with aspects of the present disclosure. The operations of the method 2000 may be implemented by a UE or its components as described herein. For example, the operations of the method 2000 may be performed by a UE 115 as described with reference to FIGS. 1 through 13. In some examples, a UE may execute a set of instructions to control the functional elements of the UE to perform the described functions. Additionally or alternatively, the UE may perform aspects of the described functions using special-purpose hardware.

At 2005, the method may include receiving, from a base station, control information in one or more of RRC signaling, a MAC-CE, DCI, or any combinations thereof, the control information indicating a symbol structure for a set of symbols, the symbol structure including a symbol format of a set of multiple symbol formats for one or more subsets of the set of symbols. The operations of 2005 may be performed in accordance with examples as disclosed herein. In some examples, aspects of the operations of 2005 may be performed by a symbol format manager 1225 as described with reference to FIG. 12.

At 2010, the method may include identifying, based on the symbol format of the set of multiple symbol formats, a first guard interval format of a first subset of the set of symbols. The operations of 2010 may be performed in accordance with examples as disclosed herein. In some examples, aspects of the operations of 2010 may be performed by a guard interval manager 1230 as described with reference to FIG. 12.

At 2015, the method may include communicating with the base station during the first subset of symbols in accordance with the first guard interval format. The operations of 2015 may be performed in accordance with examples as disclosed herein. In some examples, aspects of the operations of 2015 may be performed by a GI-based communication manager 1235 as described with reference to FIG. 12.

Figure 21:
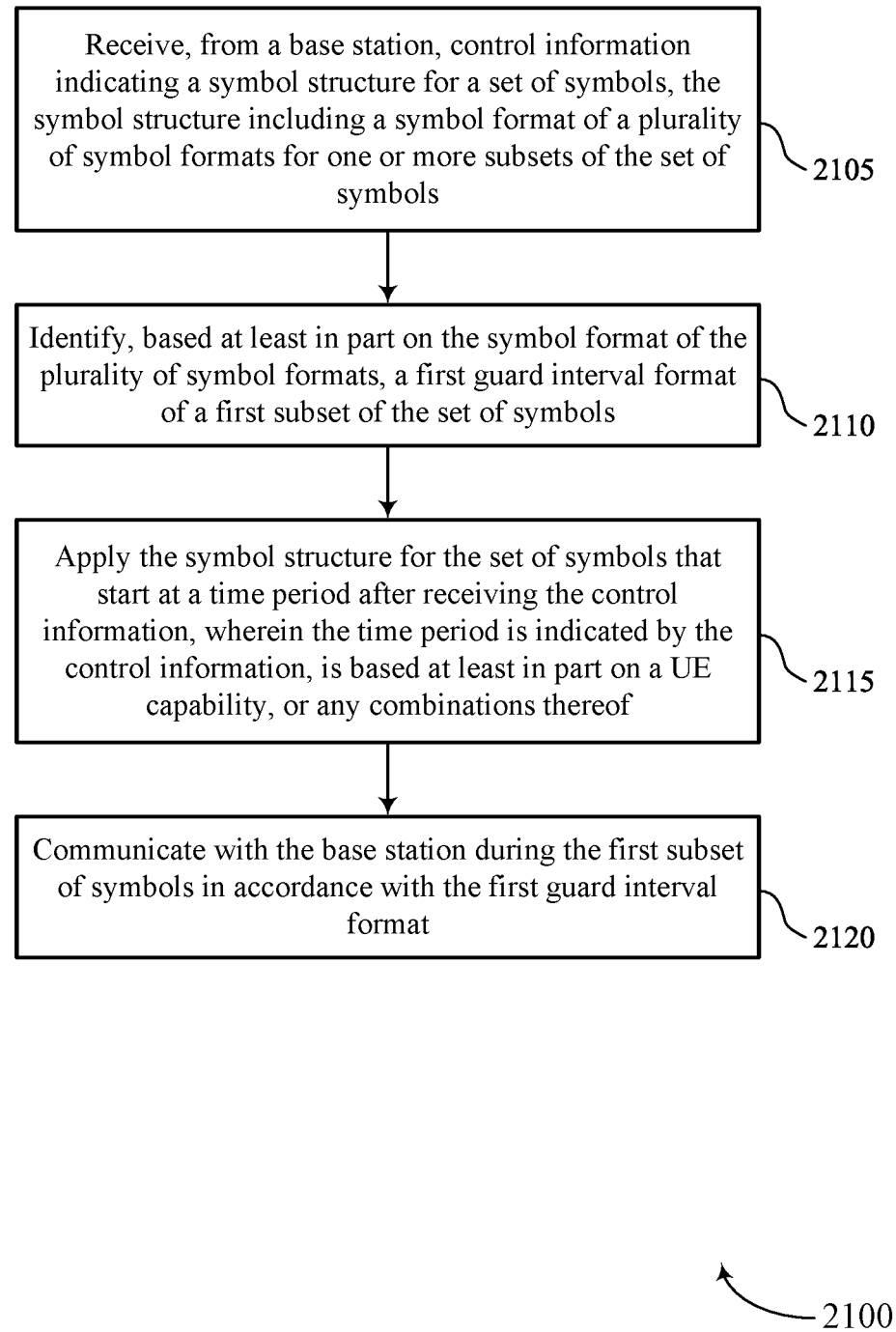

FIG. 21 shows a flowchart illustrating a method 2100 that supports techniques for signaling symbol format for guard interval based waveforms in accordance with aspects of the present disclosure. The operations of the method 2100 may be implemented by a UE or its components as described herein. For example, the operations of the method 2100 may be performed by a UE 115 as described with reference to FIGS. 1 through 13. In some examples, a UE may execute a set of instructions to control the functional elements of the UE to perform the described functions. Additionally or alternatively, the UE may perform aspects of the described functions using special-purpose hardware.

At 2105, the method may include receiving, from a base station, control information indicating a symbol structure for a set of symbols, the symbol structure including a symbol format of a set of multiple symbol formats for one or more subsets of the set of symbols. The operations of 2105 may be performed in accordance with examples as disclosed herein. In some examples, aspects of the operations of 2105 may be performed by a symbol format manager 1225 as described with reference to FIG. 12.

At 2110, the method may include identifying, based on the symbol format of the set of multiple symbol formats, a first guard interval format of a first subset of the set of symbols. The operations of 2110 may be performed in accordance with examples as disclosed herein. In some examples, aspects of the operations of 2110 may be performed by a guard interval manager 1230 as described with reference to FIG. 12.

At 2115, the method may include applying the symbol structure for the set of symbols that start at a time period after receiving the control information, where the time period is indicated by the control information, is based on a UE capability, or any combinations thereof. The operations of 2115 may be performed in accordance with examples as disclosed herein. In some examples, aspects of the operations of 2115 may be performed by a GI-based communication manager 1235 as described with reference to FIG. 12.

At 2120, the method may include communicating with the base station during the first subset of symbols in accordance with the first guard interval format. The operations of 2120 may be performed in accordance with examples as disclosed herein. In some examples, aspects of the operations of 2120 may be performed by a GI-based communication manager 1235 as described with reference to FIG. 12.

Figure 22:
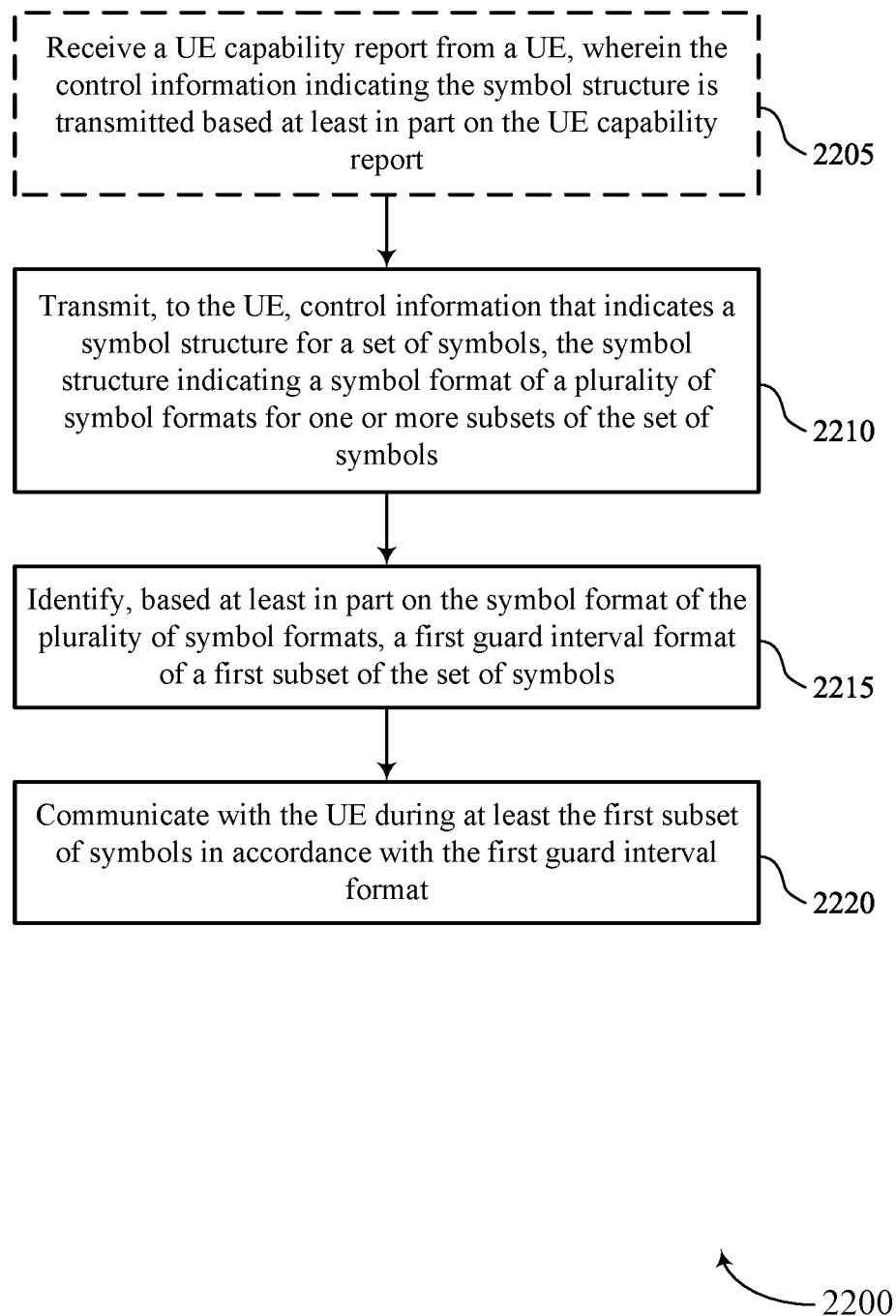

FIG. 22 shows a flowchart illustrating a method 2200 that supports techniques for signaling symbol format for guard interval based waveforms in accordance with aspects of the present disclosure. The operations of the method 2200 may be implemented by a base station or its components as described herein. For example, the operations of the method 2200 may be performed by a base station 105 as described with reference to FIGS. 1 through 9 and 14 through 17. In some examples, a base station may execute a set of instructions to control the functional elements of the base station to perform the described functions. Additionally or alternatively, the base station may perform aspects of the described functions using special-purpose hardware.

Optionally, at 2205, the method may include receiving a UE capability report from a UE, where the control information indicating the symbol structure is transmitted based on the UE capability report. The operations of 2205 may be performed in accordance with examples as disclosed herein. In some examples, aspects of the operations of 2205 may be performed by a capability manager 1645 as described with reference to FIG. 16.

At 2210, the method may include transmitting, to the UE, control information that indicates a symbol structure for a set of symbols, the symbol structure indicating a symbol format of a set of multiple symbol formats for one or more subsets of the set of symbols. The operations of 2210 may be performed in accordance with examples as disclosed herein. In some examples, aspects of the operations of 2210 may be performed by a symbol format manager 1625 as described with reference to FIG. 16.

At 2215, the method may include identifying, based on the symbol format of the set of multiple symbol formats, a first guard interval format of a first subset of the set of symbols. The operations of 2215 may be performed in accordance with examples as disclosed herein. In some examples, aspects of the operations of 2215 may be performed by a guard interval manager 1630 as described with reference to FIG. 16.

At 2220, the method may include communicating with the UE during at least the first subset of symbols in accordance with the first guard interval format. The operations of 2220 may be performed in accordance with examples as disclosed herein. In some examples, aspects of the operations of 2220 may be performed by a GI-based communication manager 1635 as described with reference to FIG. 16.

Figure 23:
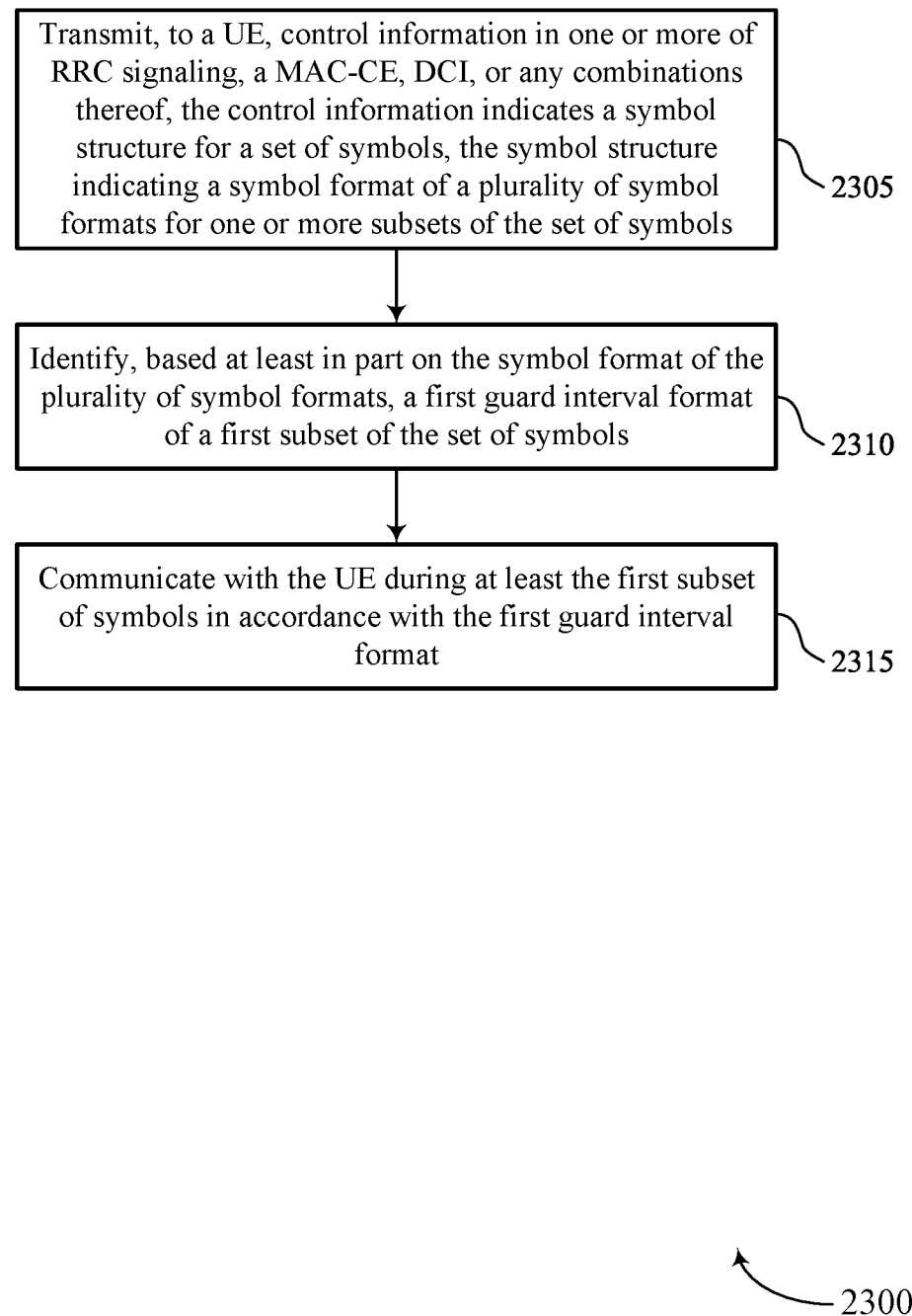

FIG. 23 shows a flowchart illustrating a method 2300 that supports techniques for signaling symbol format for guard interval based waveforms in accordance with aspects of the present disclosure. The operations of the method 2300 may be implemented by a base station or its components as described herein. For example, the operations of the method 2300 may be performed by a base station 105 as described with reference to FIGS. 1 through 9 and 14 through 17. In some examples, a base station may execute a set of instructions to control the functional elements of the base station to perform the described functions. Additionally or alternatively, the base station may perform aspects of the described functions using special-purpose hardware.

At 2305, the method may include transmitting, to a UE, control information in one or more of RRC signaling, a MAC-CE, DCI, or any combinations thereof, where the control information indicates a symbol structure for a set of symbols, the symbol structure indicating a symbol format of a set of multiple symbol formats for one or more subsets of the set of symbols The operations of 2305 may be performed in accordance with examples as disclosed herein. In some examples, aspects of the operations of 2305 may be performed by a configuration manager 1640 as described with reference to FIG. 16.

At 2310, the method may include identifying, based on the symbol format of the set of multiple symbol formats, a first guard interval format of a first subset of the set of symbols. The operations of 2310 may be performed in accordance with examples as disclosed herein. In some examples, aspects of the operations of 2310 may be performed by a guard interval manager 1630 as described with reference to FIG. 16.

At 2315, the method may include communicating with the UE during at least the first subset of symbols in accordance with the first guard interval format. The operations of 2315 may be performed in accordance with examples as disclosed herein. In some examples, aspects of the operations of 2315 may be performed by a GI-based communication manager 1635 as described with reference to FIG. 16.

Figure 24:
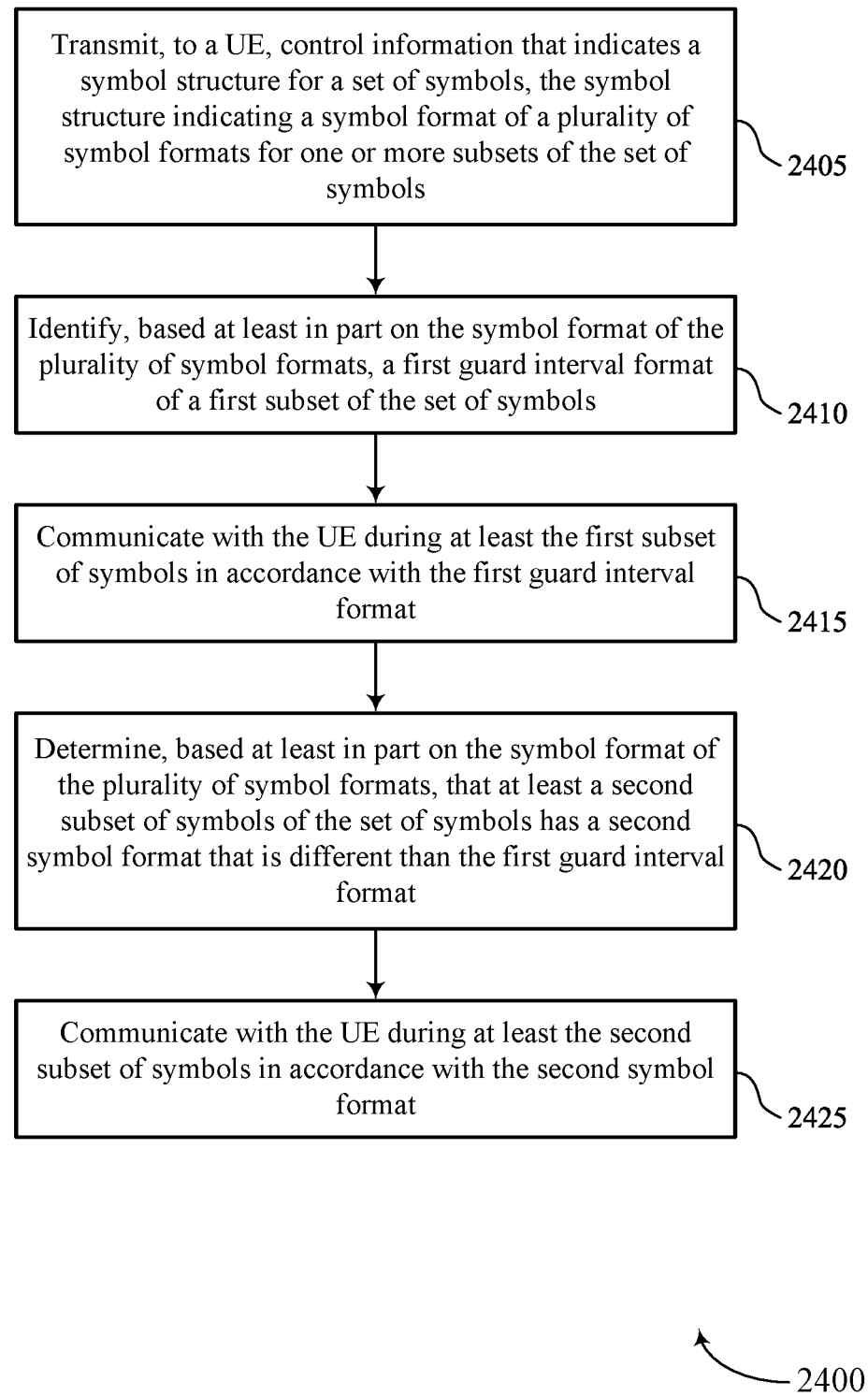

FIG. 24 shows a flowchart illustrating a method 2400 that supports techniques for signaling symbol format for guard interval based waveforms in accordance with aspects of the present disclosure. The operations of the method 2400 may be implemented by a base station or its components as described herein. For example, the operations of the method 2400 may be performed by a base station 105 as described with reference to FIGS. 1 through 9 and 14 through 17. In some examples, a base station may execute a set of instructions to control the functional elements of the base station to perform the described functions. Additionally or alternatively, the base station may perform aspects of the described functions using special-purpose hardware.

At 2405, the method may include transmitting, to a UE, control information that indicates a symbol structure for a set of symbols, the symbol structure indicating a symbol format of a set of multiple symbol formats for one or more subsets of the set of symbols. The operations of 2405 may be performed in accordance with examples as disclosed herein. In some examples, aspects of the operations of 2405 may be performed by a symbol format manager 1625 as described with reference to FIG. 16.

At 2410, the method may include identifying, based on the symbol format of the set of multiple symbol formats, a first guard interval format of a first subset of the set of symbols. The operations of 2410 may be performed in accordance with examples as disclosed herein. In some examples, aspects of the operations of 2410 may be performed by a guard interval manager 1630 as described with reference to FIG. 16.

At 2415, the method may include communicating with the UE during at least the first subset of symbols in accordance with the first guard interval format. The operations of 2415 may be performed in accordance with examples as disclosed herein. In some examples, aspects of the operations of 2415 may be performed by a GI-based communication manager 1635 as described with reference to FIG. 16.

At 2420, the method may include determining, based on the symbol format of the set of multiple symbol formats, that at least a second subset of symbols of the set of symbols has a second symbol format that is different than the first guard interval format. The operations of 2420 may be performed in accordance with examples as disclosed herein. In some examples, aspects of the operations of 2420 may be performed by a symbol format manager 1625 as described with reference to FIG. 16.

At 2425, the method may include communicating with the UE during at least the second subset of symbols in accordance with the second symbol format. The operations of 2425 may be performed in accordance with examples as disclosed herein. In some examples, aspects of the operations of 2425 may be performed by a GI-based communication manager 1635 as described with reference to FIG. 16.

The following provides an overview of aspects of the present disclosure:

Aspect 1: A method for wireless communication at a UE, comprising: receiving, from a base station, control information indicating a symbol structure for a set of symbols, the symbol structure including a symbol format of a plurality of symbol formats for one or more subsets of the set of symbols; identifying, based at least in part on the symbol format of the plurality of symbol formats, a first guard interval format of a first subset of the set of symbols; and communicating with the base station during the first subset of symbols in accordance with the first guard interval format.

Aspect 2: The method of aspect 1, further comprising: determining, based at least in part on the symbol format of the plurality of symbol formats, that at least a second subset of symbols has a second symbol format of the plurality of different available symbol formats that is different than the first guard interval format; and communicating with the base station during at least the second subset of symbols in accordance with the second symbol format.

Aspect 3: The method of any of aspects 1 through 2, wherein the control information indicates one or more of a guard interval length, guard interval type, a receiver discrete Fourier transform (DFT) window placement relative to a symbol boundary, a receiver DFT window size, an indication of one or more gaps within one or more symbols, or any combinations thereof, for at least the first subset of symbols.

Aspect 4: The method of aspect 3, wherein the guard interval type indicates a header guard interval in which a guard interval precedes data within a symbol, a tail guard interval in which data precedes a guard interval within the symbol, or that no guard interval is present in the symbol.

Aspect 5: The method of aspect 4, wherein the guard interval type further indicates a zero tail or unique word guard interval, a guard interval generation technique, or any combinations thereof.

Aspect 6: The method of any of aspects 3 through 5, wherein the receiver DFT window placement indicates a normal, a delayed, or an advanced receiver DFT window relative to a time domain symbol boundary.

Aspect 7: The method of any of aspects 3 through 6, wherein the receiver DFT window size indicates a DFT duration as a DFT window size value or as an indication of a selected DFT window size from a set of available DFT window sizes.

Aspect 8: The method of any of aspects 3 through 7, wherein the indication of one or more gaps within one or more symbols indicates a presence or absence of a gap associated with a guard interval within a symbol, a location of the guard interval within the symbol, or any combinations thereof.

Aspect 9: The method of any of aspects 1 through 8, wherein the receiving comprises: receiving the control information in one or more of RRC signaling, a MAC-CE, DCI, or any combinations thereof.

Aspect 10: The method of any of aspects 1 through 9, wherein the control information includes a symbol format indicator for each of the one or more subsets of the set of symbols, and wherein the symbol format indicator is transmitted in DCI or a MAC-CE associated with the set of symbols, or the symbol format indicator is configured via RRC signaling and a subsequent indicator provided in DCI or a MAC-CE can indicate a temporary change in the symbol structure.

Aspect 11: The method of any of aspects 1 through 10, wherein the control information is provided for one or more UEs, one or more beams, one or more sub-bands, one or more UE antenna panels, one or more channels, or any combinations thereof.

Aspect 12: The method of any of aspects 1 through 11, wherein the control information indicates the symbol format for each symbol of the set of symbols, or indicates a mapping between symbol formats of the one or more subsets of the set of symbols and one or more transmission parameters.

Aspect 13: The method of any of aspects 1 through 12, wherein the symbol structure is applied across all symbols after the receiving the control information, is applied according to a pattern of sets of symbols, is applied for a configured time period, is applied for one or more slots or sub-slots, or any combinations thereof.

Aspect 14: The method of any of aspects 1 through 13, further comprising: transmitting a UE capability report to the base station, wherein the control information indicating the symbol structure is received based at least in part on the UE capability report.

Aspect 15: The method of any of aspects 1 through 14, further comprising: applying the symbol structure for the set of symbols that start at a time period after receiving the control information, wherein the time period is indicated by the control information, is based at least in part on a UE capability, or any combinations thereof.

Aspect 16: A method for wireless communication at a base station, comprising: transmitting, to a UE, control information that indicates a symbol structure for a set of symbols, the symbol structure indicating a symbol format of a plurality of symbol formats for one or more subsets of the set of symbols; identifying, based at least in part on the symbol format of the plurality of symbol formats, a first guard interval format of a first subset of the set of symbols; and communicating with the UE during at least the first subset of symbols in accordance with the first guard interval format.

Aspect 17: The method of aspect 16, wherein the control information indicates one or more of a guard interval length, guard interval type, a receiver discrete Fourier transform (DFT) window placement relative to a symbol boundary, a receiver DFT window size, an indication of one or more gaps within one or more symbols, or any combinations thereof, for at least the first subset of symbols.

Aspect 18: The method of aspect 17, wherein the guard interval type indicates a header guard interval in which a guard interval precedes data within a symbol, a tail guard interval in which data precedes the guard interval within the symbol, or that no guard interval is present in the symbol.

Aspect 19: The method of any of aspects 17 through 18, wherein the receiver DFT window placement indicates a normal, a delayed, or an advanced receiver DFT window relative to a time domain symbol boundary, and the receiver DFT window size indicates a DFT duration as a DFT window size value or as an indication of a selected DFT window size from a set of available DFT window sizes.

Aspect 20: The method of any of aspects 16 through 19, wherein the transmitting comprises: transmitting the control information in one or more of RRC signaling, a medium access control (MAC) control element, downlink control information, or any combinations thereof.

Aspect 21: The method of any of aspects 16 through 20, further comprising: determining, based at least in part on the symbol format of the plurality of symbol formats, that at least a second subset of symbols of the set of symbols has a second symbol format that is different than the first guard interval format; and communicating with the UE during at least the second subset of symbols in accordance with the second symbol format.

Aspect 22: The method of any of aspects 16 through 21, wherein the control information includes a symbol format indicator for each of the one or more subsets of the set of symbols, and wherein the symbol format indicator is transmitted in DCI or a medium access control (MAC) control element (CE) associated with the set of symbols, or the symbol format indicator is configured via RRC signaling and a subsequent indicator provided in DCI or a MAC-CE can indicate a temporary change in the symbol structure.

Aspect 23: The method of any of aspects 16 through 22, further comprising: receiving a UE capability report from the UE, wherein the control information indicating the symbol structure is transmitted based at least in part on the UE capability report.

Aspect 24: An apparatus for wireless communication at a UE, comprising a processor; memory coupled with the processor; and instructions stored in the memory and executable by the processor to cause the apparatus to perform a method of any of aspects 1 through 15.

Aspect 25: An apparatus for wireless communication at a UE, comprising at least one means for performing a method of any of aspects 1 through 15.

Aspect 26: A non-transitory computer-readable medium storing code for wireless communication at a UE, the code comprising instructions executable by a processor to perform a method of any of aspects 1 through 15.

Aspect 27: An apparatus for wireless communication at a base station, comprising a processor; memory coupled with the processor; and instructions stored in the memory and executable by the processor to cause the apparatus to perform a method of any of aspects 16 through 23.

Aspect 28: An apparatus for wireless communication at a base station, comprising at least one means for performing a method of any of aspects 16 through 23.

Aspect 29: A non-transitory computer-readable medium storing code for wireless communication at a base station, the code comprising instructions executable by a processor to perform a method of any of aspects 16 through 23.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   transmitting a UE capability report to an access network entity, wherein the UE capability report indicates one or more symbol structures supported by the UE;
   receiving control information indicating a symbol structure for a set of symbols within a resource allocation of the UE and indicating a time period to apply the symbol structure, the symbol structure including a symbol format of a plurality of symbol formats for a plurality of subsets of symbols for data transmission within the set of symbols, at least one subset of the plurality of subsets of symbols having a different symbol format of the plurality of symbol formats than at least one other subset of the plurality of subsets of symbols, wherein the symbol structure is one of the one or more symbol structures indicated via the UE capability report, and the time period being based at least in part on the UE capability report,
   wherein the control information further indicates a guard interval, a guard interval type, and one or more of a receiver discrete Fourier transform (DFT) window placement relative to a symbol boundary, a receiver DFT window size, an indication of one or more gaps within one or more symbols, or any combinations thereof, for at least a first subset of symbols of the plurality of subsets of symbols;
   identifying, based at least in part on the symbol format of the plurality of symbol formats, the guard interval, and the guard interval type, a first guard interval format of the first subset of symbols of the plurality of subsets of symbols, the first subset of symbols starting after the time period from receiving the control information; and
   communicating with the access network entity during the first subset of symbols in accordance with the first guard interval format.

2. The method of claim 1, further comprising:
   determining, based at least in part on the symbol format of the plurality of symbol formats, that at least a second subset of symbols has a second symbol format of the plurality of symbol formats that is different than the first guard interval format; and
   communicating with the access network entity during at least the second subset of symbols in accordance with the second symbol format.

3. The method of claim 1, wherein the guard interval type indicates a header guard interval in which a guard interval precedes data within a symbol, a tail guard interval in which the data precedes the guard interval within the symbol, or that no guard interval is present in the symbol.

4. The method of claim 1, wherein the guard interval type further indicates a zero tail or unique word guard interval, a guard interval generation technique, or any combinations thereof.

5. The method of claim 1, wherein the receiver DFT window placement indicates a normal, a delayed, or an advanced receiver DFT window relative to a time domain symbol boundary.

6. The method of claim 1, wherein the receiver DFT window size indicates a DFT duration as a DFT window size value or as an indication of a selected DFT window size from a set of available DFT window sizes.

7. The method of claim 1, wherein the indication of the one or more gaps within the one or more symbols indicates a presence or absence of a gap associated with a guard interval within a symbol, a location of the guard interval within the symbol, or any combinations thereof.

8. The method of claim 1, wherein the receiving comprises:
receiving the control information in one or more of radio resource control (RRC) signaling, a medium access control (MAC) control element, downlink control information, or any combinations thereof.

9. The method of claim 1, wherein the control information includes a symbol format indicator for each of the plurality of subsets of the set of symbols, and wherein the symbol format indicator is transmitted in downlink control information (DCI) or a medium access control (MAC) control element (CE) associated with the set of symbols, or the symbol format indicator is configured via radio resource control (RRC) signaling and a subsequent indicator provided in a subsequent DCI or a subsequent MAC-CE can indicate a temporary change in the symbol structure.

10. The method of claim 1, wherein the control information is provided for one or more UEs, one or more beams, one or more sub-bands, one or more UE antenna panels, one or more channels, or any combinations thereof.

11. The method of claim 1, wherein the control information indicates the symbol format for each symbol of the set of symbols, or indicates a mapping between symbol formats of the plurality of subsets of the set of symbols and one or more transmission parameters.

12. The method of claim 1, wherein the symbol structure is applied across all symbols after the receiving the control information, is applied according to a pattern of sets of symbols, is applied for a configured time period, is applied for one or more slots or sub-slots, or any combinations thereof.

13. A method for wireless communication at an access network entity, comprising:
receiving, from a user equipment (UE), a UE capability report, wherein the UE capability report indicates one or more symbol structures supported by the UE;
transmitting, to the UE, control information that indicates a symbol structure for a set of symbols within a resource allocation of the UE and indicating a time period to apply the symbol structure, the symbol structure including a symbol format of a plurality of symbol formats for a plurality of subsets of symbols for data transmission within the set of symbols, at least one subset of the plurality of subsets of symbols having a different symbol format of the plurality of symbol formats than at least one other subset of the plurality of subsets of symbols, wherein the symbol structure is one of the one or more symbol structures indicated via the UE capability report, and the time period being based at least in part on the UE capability report,
wherein the control information further indicates a guard interval, a guard interval type, and one or more of a receiver discrete Fourier transform (DFT) window placement relative to a symbol boundary, a receiver DFT window size, an indication of one or more gaps within one or more symbols, or any combinations thereof, for at least a first subset of symbols of the plurality of subsets of symbols;
identifying, based at least in part on the symbol format of the plurality of symbol formats, the guard interval, and the guard interval type, a first guard interval format of the first subset of symbols of the plurality of subsets of symbols, the first subset of symbols starting after the time period from transmitting the control information; and
communicating with the UE during at least the first subset of symbols in accordance with the first guard interval format.

14. The method of claim 13, wherein the guard interval type indicates a header guard interval in which a guard interval precedes data within a symbol, a tail guard interval in which the data precedes the guard interval within the symbol, or that no guard interval is present in the symbol.

15. The method of claim 13, wherein the receiver DFT window placement indicates a normal, a delayed, or an advanced receiver DFT window relative to a time domain symbol boundary, and the receiver DFT window size indicates a DFT duration as a DFT window size value or as an indication of a selected DFT window size from a set of available DFT window sizes.

16. The method of claim 13, wherein the transmitting comprises:
transmitting the control information in one or more of radio resource control (RRC) signaling, a medium access control (MAC) control element, downlink control information, or any combinations thereof.

17. The method of claim 13, further comprising:
determining, based at least in part on the symbol format of the plurality of symbol formats, that at least a second subset of symbols of the set of symbols has a second symbol format that is different than the first guard interval format; and
communicating with the UE during at least the second subset of symbols in accordance with the second symbol format.

18. The method of claim 13, wherein the control information includes a symbol format indicator for each of the plurality of subsets of the set of symbols, and wherein the symbol format indicator is transmitted in downlink control information (DCI) or a medium access control (MAC) control element (CE) associated with the set of symbols, or the symbol format indicator is configured via radio resource control (RRC) signaling and a subsequent indicator provided in a subsequent DCI or a subsequent MAC-CE can indicate a temporary change in the symbol structure.

19. An apparatus for wireless communication at a user equipment (UE), comprising:
one or more memories storing processor-executable code; and
one or more processors coupled with the one or more memories and individually or collectively operable to execute the code to cause the apparatus to:
transmit a UE capability report to an access network entity, wherein the UE capability report indicates one or more symbol structures supported by the UE;
receive control information indicating a symbol structure for a set of symbols within a resource allocation of the UE and indicating a time period to apply the symbol structure, the symbol structure including a symbol format of a plurality of symbol formats for a plurality of subsets of symbols for data transmission within the set of symbols, at least one subset of the plurality of subsets of symbols having a different symbol format of the plurality of symbol formats than at least one other subset of the plurality of subsets of symbols, wherein the symbol structure is one of the one or more symbol structures indicated via the UE capability report, and the time period being based at least in part on the UE capability report,
wherein the control information further indicates a guard interval, a guard interval type, and one or more of a receiver discrete Fourier transform (DFT) window placement relative to a symbol boundary, a receiver DFT window size, an indication of one or more gaps within one or more symbols, or any combinations thereof, for at least a first subset of symbols of the plurality of subsets of symbols;

identify, based at least in part on the symbol format of the plurality of symbol formats, the guard interval, and the guard interval type, a first guard interval format of the first subset of symbols of the plurality of subsets of symbols, the first subset of symbols starting after the time period from receiving the control information; and communicate with the access network entity during the first subset of symbols in accordance with the first guard interval format.

20. The apparatus of claim 19, wherein the one or more processors are further operable to cause the apparatus to:

determine, based at least in part on the symbol format of the plurality of symbol formats, that at least a second subset of symbols has a second symbol format of the plurality of symbol formats that is different than the first guard interval format; and communicate with the access network entity during at least the second subset of symbols in accordance with the second symbol format.

21. The apparatus of claim 20, wherein the control information is provided for one or more UEs, one or more beams, one or more sub-bands, one or more UE antenna panels, one or more channels, or any combinations thereof.

22. An apparatus for wireless communication at an access network entity, comprising:

one or more memories storing processor-executable code; and one or more processors coupled with the one or more memories and individually or collectively operable to execute the code to cause the apparatus to:

receive, from a user equipment (UE), a UE capability report, wherein the UE capability report indicates one or more symbol structures supported by the UE;

transmit, to the UE, control information that indicates a symbol structure for a set of symbols within a resource allocation of the UE and indicating a time period to apply the symbol structure, the symbol structure including a symbol format of a plurality of symbol formats for a plurality of subsets of symbols for data transmission within the set of symbols, at least one subset of the plurality of subsets of symbols having a different symbol format of the plurality of symbol formats than at least one other subset of the plurality of subsets of symbols, wherein the symbol structure is one of the one or more symbol structures indicated via the UE capability report, and the time period being based at least in part on the UE capability report, wherein the control information further indicates a guard interval, a guard interval type, and one or more of a receiver discrete Fourier transform (DFT) window placement relative to a symbol boundary, a receiver DFT window size, an indication of one or more gaps within one or more symbols, or any combinations thereof, for at least a first subset of symbols of the plurality of subsets of symbols;

identify, based at least in part on the symbol format of the plurality of symbol formats, the guard interval, and the guard interval type, a first guard interval format of the first subset of symbols of the plurality of subsets of symbols, the first subset of symbols starting after the time period from transmitting the control information; and communicate with the UE during at least the first subset of symbols in accordance with the first guard interval format.

23. The apparatus of claim 22, wherein the one or more processors are further operable to cause the apparatus to:

transmit the control information in one or more of radio resource control (RRC) signaling, a medium access control (MAC) control element, downlink control information, or any combinations thereof.

* * * * *